United States Patent
Jung et al.

(10) Patent No.: US 10,660,166 B2
(45) Date of Patent: May 19, 2020

(54) MICROWAVE HEATING APPARATUS FOR UNIFORMLY HEATING OBJECTS BASED ON NEAR-CUTOFF CONDITION

(71) Applicant: KOREA ELECTROTECHNOLOGY RESEARCH INSTITUTE, Changwon (KR)

(72) Inventors: Sun Shin Jung, Ansan (KR); Dae Ho Kim, Ansan (KR); Seung Kwon Seol, Seoul (KR); Geon Woong Lee, Changwon (KR); Won Suk Chang, Seoul (KR); Seung Yol Jeong, Changwon (KR); Hee Jin Jeong, Changwon (KR); Joong Tark Han, Changwon (KR)

(73) Assignee: KOREA ELECTROTECHNOLOGY RESEARCH INSTITUTE, Changwon (KR)

( * ) Notice: Subject to any disclaimer, the term of this patent is extended or adjusted under 35 U.S.C. 154(b) by 953 days.

(21) Appl. No.: 14/401,487

(22) PCT Filed: May 14, 2013

(86) PCT No.: PCT/KR2013/004243
§ 371 (c)(1),
(2) Date: Nov. 14, 2014

(87) PCT Pub. No.: WO2013/172620
PCT Pub. Date: Nov. 21, 2013

(65) Prior Publication Data
US 2015/0136761 A1   May 21, 2015

(30) Foreign Application Priority Data

May 14, 2012  (KR) .................. 10-2012-0050641
Oct. 26, 2012  (KR) .................. 10-2012-0119722
Oct. 26, 2012  (KR) .................. 10-2012-0119725

(51) Int. Cl.
*H05B 6/70*   (2006.01)

(52) U.S. Cl.
CPC ............. *H05B 6/705* (2013.01); *H05B 6/701* (2013.01); *H05B 6/707* (2013.01); *Y02B 40/146* (2013.01)

(58) Field of Classification Search
CPC ......... H05B 6/701; H05B 6/705; H05B 6/707
(Continued)

(56) References Cited

U.S. PATENT DOCUMENTS 2,577,146 A * 12/1951 Norton ................. H03C 7/02
                                                                        313/607
2,774,946 A * 12/1956 McGillem ............. H01P 1/00
                                                                        333/157

(Continued)

FOREIGN PATENT DOCUMENTS

JP          49-10376 B        1/1974
JP          60-240094 A      11/1985
(Continued)

OTHER PUBLICATIONS

International Search Report for PCT/KR2013/004243 filed May 14, 2013.

*Primary Examiner* — Ibrahime A Abraham
*Assistant Examiner* — Justin C Dodson

(57) ABSTRACT

The microwave heating apparatus of the present invention enables microwaves to be propagated onto an object to be heated through a waveguide such that the microwaves propagate to a microwave space reduced by a wavelength controller which is arranged, as a solid-state object, to occupy a predetermined space in the waveguide. Thus, the microwave heating apparatus of the present invention heats the object to be heated which has been placed in the reduced space. The microwave heating apparatus of the present invention utilizes the effects of lengthening the wavelength of the microwaves propagating to the reduced space so as to (Continued)

be longer than the wavelength before entering the reduced space by a predetermined multiple depending on a near-cutoff condition.

18 Claims, 21 Drawing Sheets

(58) Field of Classification Search
USPC ........ 219/690–693, 696–699, 745–747, 750, 219/752–755
See application file for complete search history.

(56) References Cited

U.S. PATENT DOCUMENTS

| | | | | |
|---|---|---|---|---|
| 3,784,777 A | * | 1/1974 | Soulier | H05B 6/788 219/693 |
| 5,400,524 A | | 3/1995 | Crosnier Leconte et al. | |
| 5,410,283 A | * | 4/1995 | Gooray | H01P 1/182 333/159 |
| 5,782,897 A | * | 7/1998 | Carr | G01N 1/31 606/27 |
| 6,066,838 A | * | 5/2000 | Koda | H05B 6/688 219/696 |
| 2011/0031239 A1 | * | 2/2011 | Taguchi | H05B 6/701 219/745 |

FOREIGN PATENT DOCUMENTS

| | | |
|---|---|---|
| JP | 6-501335 A | 2/1994 |
| JP | 2002-504668 A | 2/2002 |
| JP | 2003-519894 A | 6/2003 |
| JP | 2008-166090 A | 7/2008 |
| JP | 2009-181900 A | 8/2009 |
| JP | 2011-150911 A | 8/2011 |

* cited by examiner

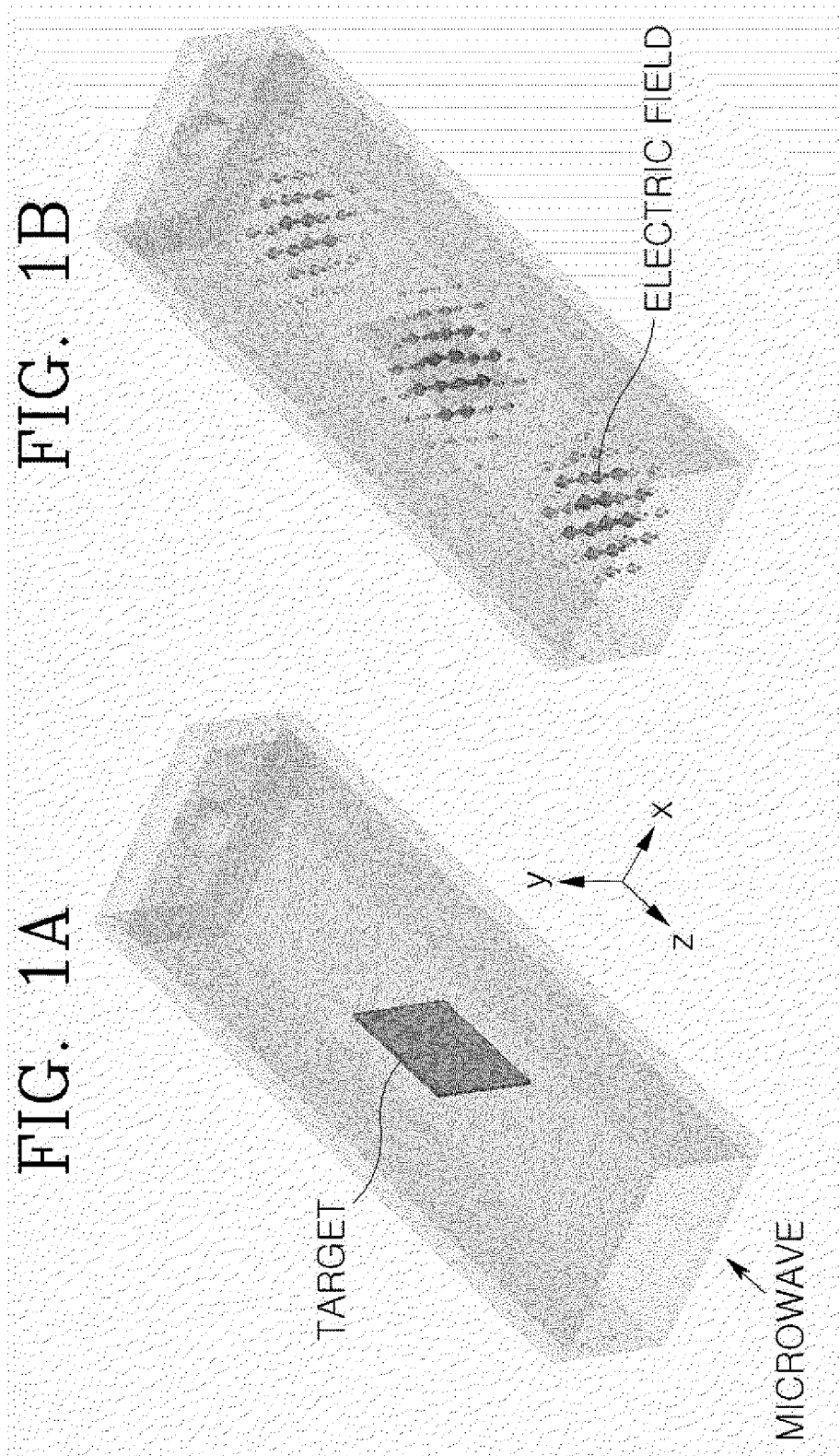
[PRIOR ART]

MICROWAVE HEATING APPARATUS FOR UNIFORMLY HEATING OBJECTS BASED ON NEAR-CUTOFF CONDITION

TECHNICAL FIELD

The present invention relates generally to a microwave heating apparatus and, more particularly, to a microwave heating apparatus that is capable of uniformly heating a target within a waveguide under a near-cutoff condition.

BACKGROUND ART

Heating using microwaves (e.g., having frequencies ranging from 300 MHz to 300 GHz) includes dielectric heating based on dielectric loss, which heats a target while causing energy loss in the target, and Joule heating based on induced current, which causes an induced current in a target and heats the target using a resistance component.

FIGS. 1A and 1B are diagrams showing a conventional microwave heating scheme for heating a target in a waveguide.

As shown in FIG. 1A, when a microwave is propagated into a waveguide so as to heat a plate-shaped or film-shaped target within the waveguide, the target may be heated via dielectric heating or joule heating due to the microwave traveling in a z direction in the drawing. In this case, when the width direction of the target is disposed in the z direction in the drawing, it may be assumed that the thickness (x direction) of the target is much smaller than the wavelength of a microwave, and that an electric field generated in a y direction due to the microwave is maintained at a uniform intensity in a Transverse Electric (TE) mode, as shown in FIG. 1B. Accordingly, the heating uniformity of a target may differ depending on the traveling status of the microwave in the z direction. That is, there is a problem in that, when the z direction length of the target becomes greater than ¼ of the wavelength of the microwave, the target is not uniformly heated depending on the locations of the target in the z axis direction.

FIGS. 2A and 2B are diagrams showing the distribution of power transmission depending on the location of a target in the traveling direction of a microwave within a waveguide in a conventional microwave heating scheme.

As shown in FIG. 2A, when the microwave travels along the target, microwave power is attenuated due to the occurrence of power loss depending on the location of the target, and thus a problem also arises in that non-uniform heating occurs due to a difference in power loss depending on the z direction location of the target. In particular, as shown in FIG. 2B, when the wavelength of a microwave (e.g., 12.2 cm) is not much greater than the size of the target (e.g., 4.3 cm×5 cm), the intensity of microwave power loss varies depending on the z direction location of the target, thus causing non-uniform heating.

DISCLOSURE

Technical Problem

Accordingly, the present invention has been made keeping in mind the above problems, and an object of the present invention is to provide a microwave heating apparatus that can not only uniformly heat a target by controlling a microwave so that the wavelength of the microwave is lengthened within a waveguide, based on a near-cutoff condition that restricts the transverse path of a traveling wave, but can also more uniformly heat the target by partially compensating for attenuated power of the microwave traveling along the target with a reflected wave generated by a reflecting means that is operating in various forms.

Another object of the present invention is to provide a microwave heating apparatus that employs a scheme capable of uniformly heating a target by causing a microwave to be incident on opposite sides of a waveguide under a near-cutoff condition using a microwave generator.

A further object of the present invention is to provide a microwave heating apparatus that can heat a continuously inserted target by combining a waveguide under a near-cutoff condition with an additional waveguide under a near-cutoff condition or under a cutoff condition.

Technical Solution

First, the characteristics of the present invention are summarized as follows. A heating method using a microwave in accordance with an aspect of the present invention to accomplish the above objects includes causing a microwave to travel to a target within a waveguide, wherein the microwave is caused to travel to a microwave traveling space reduced by a wavelength controller made of a solid material and provided to occupy a predetermined space within the waveguide, thus heating the target located in the reduced space, wherein the heating method uses an effect of lengthening a wavelength of the microwave traveling to the reduced space by a predetermined multiple or more of that of the microwave before entering the reduced space depending on a near-cutoff condition.

Further, a microwave heating apparatus in accordance with another aspect of the present invention includes a waveguide configured to accommodate a target; and a wavelength controller made of a solid material and provided to occupy a predetermined space within the waveguide, wherein the wavelength controller reduces a transverse space through which a microwave traveling in a longitudinal direction of the waveguide passes, and lengthens a wavelength of the microwave traveling to the reduced space by a predetermined multiple or more of a previous wavelength of the microwave depending on a near-cutoff condition, thus enabling the target in the reduced space to be heated.

Heating uniformity for individual locations of the target may be improved due to the wavelength of the microwave lengthened in the reduced space.

By the wavelength controller, in the reduced space, the wavelength of the microwave may become 2.0 to 100 times or more longer than a free space wavelength of the microwave. The wavelength controller may include an inclined surface-shaped matching area required to gradually reduce the transverse space in a longitudinal front or rear portion of the wavelength controller in order to reduce reflection of the microwave and improve transmissibility of the microwave.

The wavelength controller may include location control means attached to a side surface thereof, wherein the location control means is pushed or pulled either manually or using a mechanical device, thus moving the wavelength controller in a transverse direction.

The microwave heating apparatus may further include comprising a reflecting plate, wherein a microwave output from the reduced space is reflected by the reflecting plate and travels back towards the target in the reduced space, thus compensating for differences in attenuated power of the microwave in the target and improving heating uniformity for individual locations of the target.

The microwave heating apparatus may further include a reflecting plate for reciprocating forwards and backwards by a preset distance while the target is heated so that a microwave output from the reduced space is reflected towards the target.

The microwave heating apparatus may further include a reflecting plate for reciprocating and rotating at a preset angle while the target is heated so that a microwave output from the reduced space is reflected towards the target.

The microwave heating apparatus may further include a reflecting plate for repeatedly rotating at an angle of 360° while the target is heated so that a microwave output from the reduced space is reflected towards the target.

With rotation or movement of the reflecting plate, an increase and a decrease in a distance between the target and a corresponding reflective surface of the reflecting plate are repeated, thus causing average intensity of the microwave in the target to be uniform.

The microwave heating apparatus may further include an input slit and an output slit formed to communicate with an inside of the waveguide, wherein the target is pushed in the waveguide through the input slit and the target heated in the waveguide is withdrawn from the waveguide through the output slit, either manually or using a mechanical device.

An automatic operation may be performed in such a way that, by using the mechanical device, a roll-shaped target is automatically pushed in the waveguide through the input slit on a predetermined length basis and the target, heated within the waveguide for a predetermined period of time depending on a heating condition, is automatically withdrawn from the waveguide through the output slit.

The present invention may be used to heat the target having a thickness that is ⅛ or less of a free space wavelength of the microwave.

The target may be a film-shaped target including a conductor applied to a substrate, and may be heated to improve the adhesive properties or environmental resistance of the applied conductor.

The target may be a film-shaped target including a conductor applied to a substrate, the conductor having a shape in which patterned lines are included or in which the conductor is applied to the substrate without having patterned lines.

The target may be a film-shaped target including a conductor applied to a substrate, the conductor being made of any one selected from the group consisting of a nano-carbon-based material, a nano-metal-based material, and a hybrid material of nano-carbon and a metal oxide.

The target may be a film-shaped target including a conductor applied to a substrate, the substrate being made of any one selected from the group consisting of a polyester-based polymer, a polycarbonate-based polymer, a polyethersulfone-based polymer, an acrylic-based polymer, and a polyethylene terephthalate-polymer.

Further, a microwave heating apparatus in accordance with a further embodiment of the present invention may include a waveguide having a protrusion on one wall thereof to reduce a transverse space through which a microwave traveling in a longitudinal direction passes, and causing a target to be inserted into a wavelength control space between the protrusion and an opposite wall, wherein the target is heated using an effect of lengthening a wavelength of the microwave traveling to the wavelength control space by a predetermined multiple or more of a previous wavelength of the microwave, depending on a near-cutoff condition.

In this case, the protrusion may include an inclined surface-shaped matching area required to gradually reduce the transverse space in a longitudinal front or rear portion of the protrusion in order to reduce reflection of the microwave and improve transmissibility of the microwave.

Furthermore, a heating method using a microwave in accordance with yet another embodiment includes causing a microwave to travel to a target within a waveguide, wherein the microwave is caused to travel to a wavelength control space, in which a microwave traveling space is reduced by a wavelength controller that is made of a solid material and that is provided to occupy a predetermined space within the waveguide, wherein the heating method uses an effect of lengthening a wavelength of the microwave traveling to the wavelength control space by a predetermined multiple or more of that of the microwave before entering the wavelength control space, depending on a near-cutoff condition, and wherein the target located in the wavelength control space is heated by causing a microwave, a frequency of which is changed, to be incident on a first inlet of the waveguide, or by changing an amplitude, a phase or a frequency of one or more of microwaves respectively incident on opposite inlets of the waveguide.

Furthermore, a microwave heating apparatus in accordance with further aspect of the present invention includes a waveguide configured to accommodate a target; and a wavelength controller made of a solid material and provided to occupy a predetermined space within the waveguide, wherein the wavelength controller is configured to reduce a transverse space through which a microwave traveling in a longitudinal direction of the waveguide passes, to lengthen a wavelength of the microwave traveling to a reduced wavelength control space by a predetermined multiple or more of a previous wavelength of the microwave depending on a near-cutoff condition, and to cause a microwave, a frequency of which is changed, to be incident on a first inlet of the waveguide, or to change an amplitude, a phase or a frequency of one or more of microwaves respectively incident on opposite inlets of the waveguide, thus enabling the target located in the reduced space to be heated.

Furthermore, a microwave heating apparatus in accordance with yet another aspect of the present invention includes a waveguide having a protrusion on one wall thereof to reduce a transverse space through which a microwave traveling in a longitudinal direction passes, and causing a target to be inserted into a wavelength control space between the protrusion and an opposite wall, wherein the microwave heating apparatus uses an effect of lengthening a wavelength of the microwave traveling to the wavelength control space by a predetermined multiple or more of a previous wavelength of the microwave, depending on a near-cutoff condition, and wherein the target located in the wavelength control space is heated by causing a microwave, a frequency of which is changed, to be incident on a first inlet of the waveguide, or by changing an amplitude, a phase or a frequency of one or more of microwaves respectively incident on opposite inlets of the waveguide.

A heating method using a microwave in accordance with still another aspect of the present invention includes pushing a target in and withdrawing the target from a first waveguide under a near-cutoff condition and one or more second waveguides under a near-cutoff condition or a cutoff condition arranged on or under the first waveguide through respective input slits and output slits of the first waveguide and the second waveguides, wherein microwaves are caused to travel to a wavelength control space, in which a microwave traveling space is reduced by a wavelength controller that is made of a solid material and that is provided to occupy a predetermined space within each waveguide in the first waveguide or each second waveguide under the near-cutoff condition, and the target is caused to pass through the wavelength control space, and wherein the heating method uses an effect of lengthening a wavelength of each microwave traveling to the wavelength control space by a predetermined multiple or more of that of the microwave before entering the wavelength control space depending on the near-cutoff condition.

A microwave heating apparatus in accordance with still another aspect of the present invention includes a first waveguide under a near-cutoff condition, including an input slit and an output slit formed to communicate with an inside of the first waveguide; and one or more second waveguides under a near-cutoff condition or a cutoff condition, arranged on or under the first waveguide, each second waveguide having an input slit and an output slit, wherein a target is pushed in and withdrawn from the first waveguide and each second waveguide through the respective input slits and output slits of the first waveguide and the second waveguide, wherein the first waveguide or the second waveguide under the near-cutoff condition includes a waveguide controller that is made of a solid material and that is provided to occupy a predetermined space within the corresponding waveguide, the first waveguide or the second waveguide causing the target to pass through the wavelength control space, wherein the wavelength controller is configured to reduce a transverse space through which a microwave traveling in a longitudinal direction of the corresponding waveguide passes, thus lengthening a wavelength of the microwave traveling to a reduced wavelength control space by a predetermined multiple or more of a previous wavelength of the microwave depending on the near-cutoff condition.

A microwave heating apparatus in accordance with still another aspect of the present invention includes a first waveguide under a near-cutoff condition, including an input slit and an output slit formed to communicate with an inside of the first waveguide; and one or more second waveguides under a near-cutoff condition or a cutoff condition, arranged on or under the first waveguide, each second waveguide having an input slit and an output slit, wherein a target is pushed in and withdrawn from the first waveguide and the second waveguides through respective input slits and output slits of the first waveguide and each second waveguide, wherein the first waveguide or the second waveguide under the near-cutoff condition has a protrusion on one wall thereof to reduce a transverse space through which a microwave traveling in a longitudinal direction of the corresponding waveguide passes, and causes the target to pass through a wavelength control space between the protrusion and an opposite wall, and wherein the microwave heating apparatus uses an effect of lengthening the wavelength of the microwave traveling to the wavelength control space by a predetermined multiple or more of a previous wavelength of the microwave depending on the near-cutoff condition.

Advantageous Effects

The microwave heating apparatus according to the present invention can uniformly heat a target by controlling a microwave so that the wavelength of the microwave is lengthened within a waveguide, based on a near-cutoff condition that restricts the transverse path of a traveling wave. Further, the microwave heating apparatus can more uniformly heat the target by partially compensating for attenuated power of a microwave traveling along the target with a reflected wave generated by a reflecting means that is operating in various forms.

Furthermore, the microwave heating apparatus according to the present invention can uniformly heat a target by causing a microwave to be incident even on an opposite side of a waveguide under a near-cutoff condition using a microwave generator, rather than using a reflective means.

Furthermore, the microwave heating apparatus according to the present invention can uniformly heat a continuously inserted target by combining a waveguide under a near-cutoff condition with an additional waveguide under a near-cutoff condition or under a cutoff condition.

DESCRIPTION OF DRAWINGS

FIGS. 1A and 1B are diagrams showing a conventional microwave heating scheme for heating a target within a waveguide;

BEST MODE

Figures 2A, 2B:
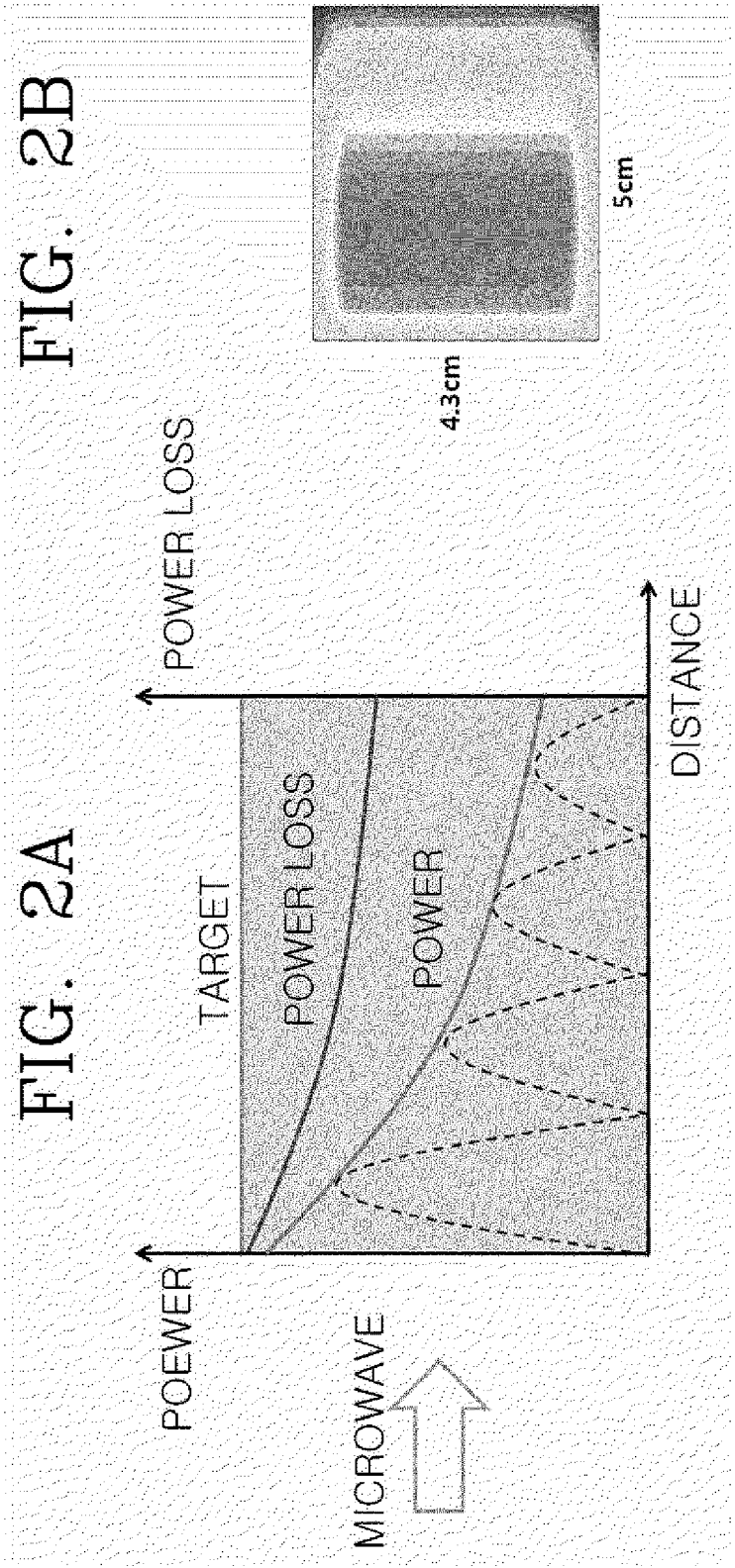
FIGS. 2A and 2B are diagrams showing the distribution of power transmission depending on the location of a target in the traveling direction of a microwave within a waveguide in a conventional microwave heating scheme.

Hereinafter, preferred embodiments of the present invention will be described in detail with reference to the attached drawings and contents described in the drawings, but the present invention is not limited or restricted by those embodiments.

Figure 3:
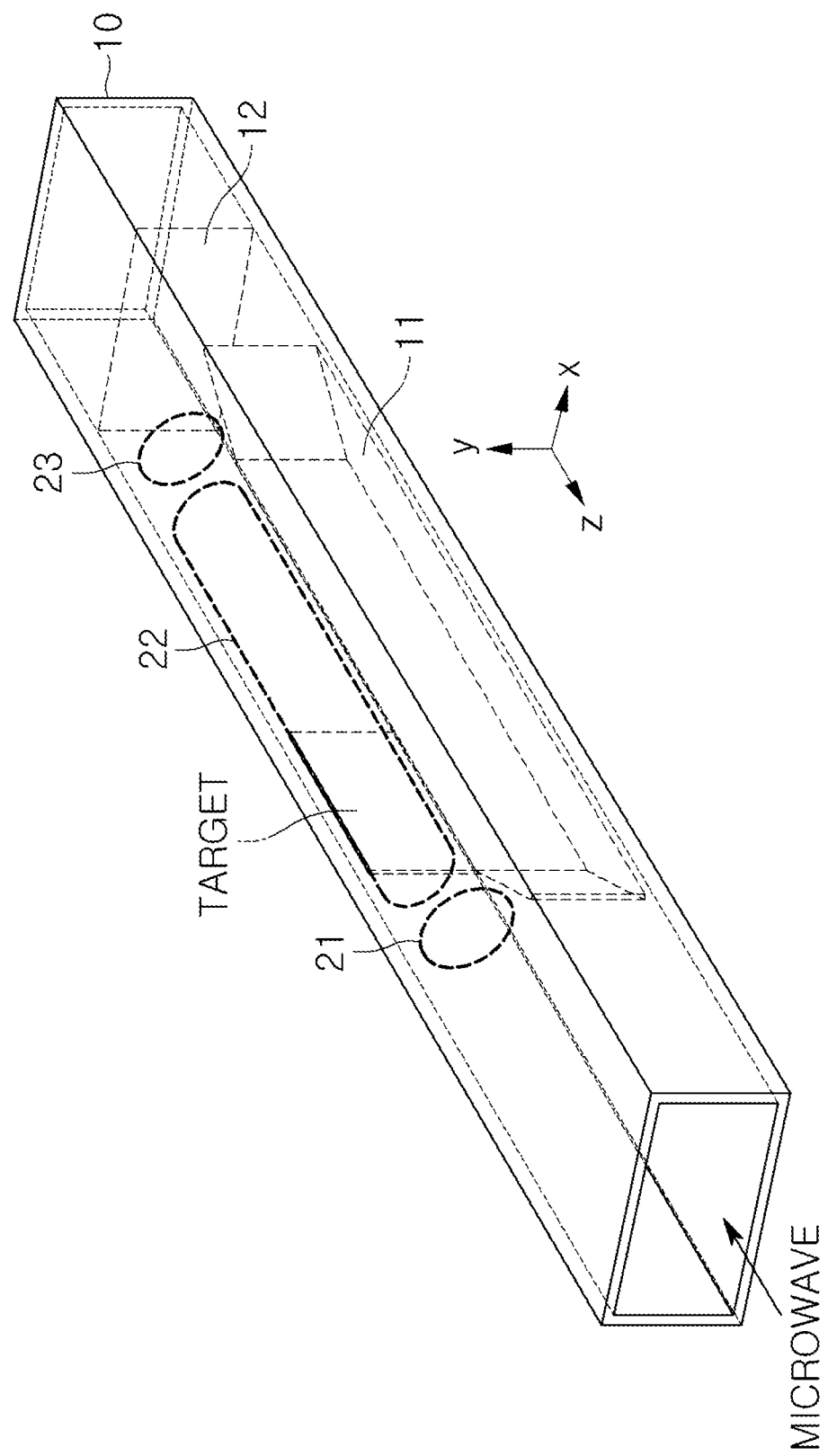
FIG. 3 is a diagram showing a microwave heating apparatus having a waveguide under a near-cutoff condition for restricting the transverse path of a traveling wave according to an embodiment of the present invention.

FIG. 3 is a diagram showing a microwave heating apparatus having a waveguide under a near-cutoff condition for restricting the transverse path of a traveling wave according to an embodiment of the present invention.

Referring to FIG. 3, the microwave heating apparatus according to the embodiment of the present invention includes a waveguide 10 for accommodating a target and a wavelength controller 11 provided in the waveguide 10, and may further include a reflecting plate 12. As shown in the drawing, the waveguide 10, which has a rectangular section that is taken along a line perpendicular to a wave traveling direction (z direction) and has a hollow shape so that a microwave may travel within the waveguide, may be made of a metal material or the like.

The microwave heating apparatus according to the embodiment of the present invention is configured to cause a microwave (e.g., having a frequency ranging from 300 MHz to 300 GHz or a wavelength ranging from 1.0 mm to 1.0 m) to travel into the waveguide 10 in a longitudinal direction (z direction) and to heat a target within the waveguide 10. The microwave heating apparatus is configured such that the wavelength controller 11 is provided to occupy a certain space in the waveguide 10. Therefore, when the microwave passes through a microwave traveling space 22 reduced by the wavelength controller 11 according to a near-cutoff condition, which will be described later, heating uniformity is improved by uniformly heating a target located in the reduced space 22, through which the microwave passes, for individual locations of the target in a longitudinal direction (z direction) by means of the effect of lengthening the wavelength of the microwave compared to that of the microwave before entering the reduced space 22.

Figure 4:
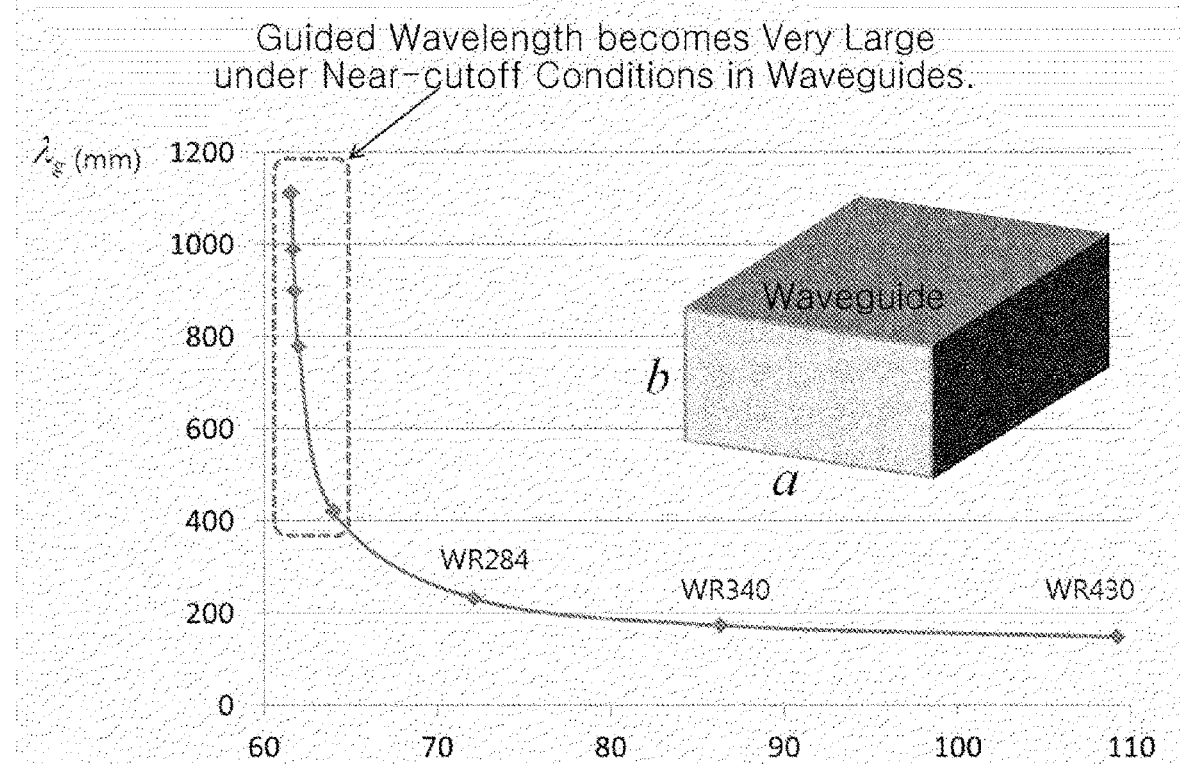
FIG. 4 is a graph showing a variation in the wavelength of a microwave within a waveguide depending on the transverse length of the waveguide to describe the concept of a near-cutoff condition.

FIG. 4 is a graph showing a variation in the wavelength of a microwave within a waveguide depending on the transverse (x direction) length (a) of the waveguide to describe the concept of a near-cutoff condition.

For example, as shown in FIG. 4, when a predetermined microwave (e.g., having a frequency of 2.45 GHz) is caused to travel into the waveguide 10 while the transverse length (a) of a waveguide 10 is reduced in a state in which the height (b) of the waveguide 10 is set to a predetermined height above the wavelength of an incident microwave, the transverse length (a) of the waveguide is decreased, and thus the wavelength of the microwave (e.g., having a frequency of 2.45 GHz) traveling within the waveguide is gradually lengthened, as given by the following equation. Here, $\lambda_0$ denotes the free space wavelength of a microwave, and $\lambda_g$ denotes the wavelength of the microwave that enters a $TE_{10}$ mode within the waveguide having a rectangular section.

$$\lambda_g = \frac{\lambda_0}{\sqrt{1-(\lambda_0/2a)^2}} \qquad \text{[Equation]}$$

For example, when the frequency of the microwave traveling into the waveguide is 2.45 GHz, $\lambda_0$ is 12.2 cm. When a=109.2 mm (e.g., the standard of WR430 waveguide), $\lambda_g$=147.8 mm, and when a=61.6 mm, $\lambda_g$=1110.7 mm. That is, by reducing the transverse length (a) of the waveguide, the wavelength of the microwave within the waveguide under the near-cutoff condition may become 2.0~100 times or more longer than the free space wavelength. When the transverse length (a) of the waveguide is infinitely reduced to half of the free space wavelength of the microwave, the wavelength of the microwave within the waveguide is theoretically, infinitely lengthened, thus cutting off the transmission of the microwave. As a result, it is preferable to set an area for a near-cutoff condition enabling suitable power transmission to an area having a size of about 2.0 to 100 times the free space wavelength of the microwave. For example, when the frequency of the microwave is 2450 MHz, the wavelength of the microwave under vacuum is about 12.2 cm, but may be lengthened to 24.4 to 1220 cm or more by the wavelength controller. Depending on the circumstances, the range of a near-cutoff condition enabling the wavelength of the microwave to be 100 times or more longer than the free space wavelength may also be used.

Figure 5:
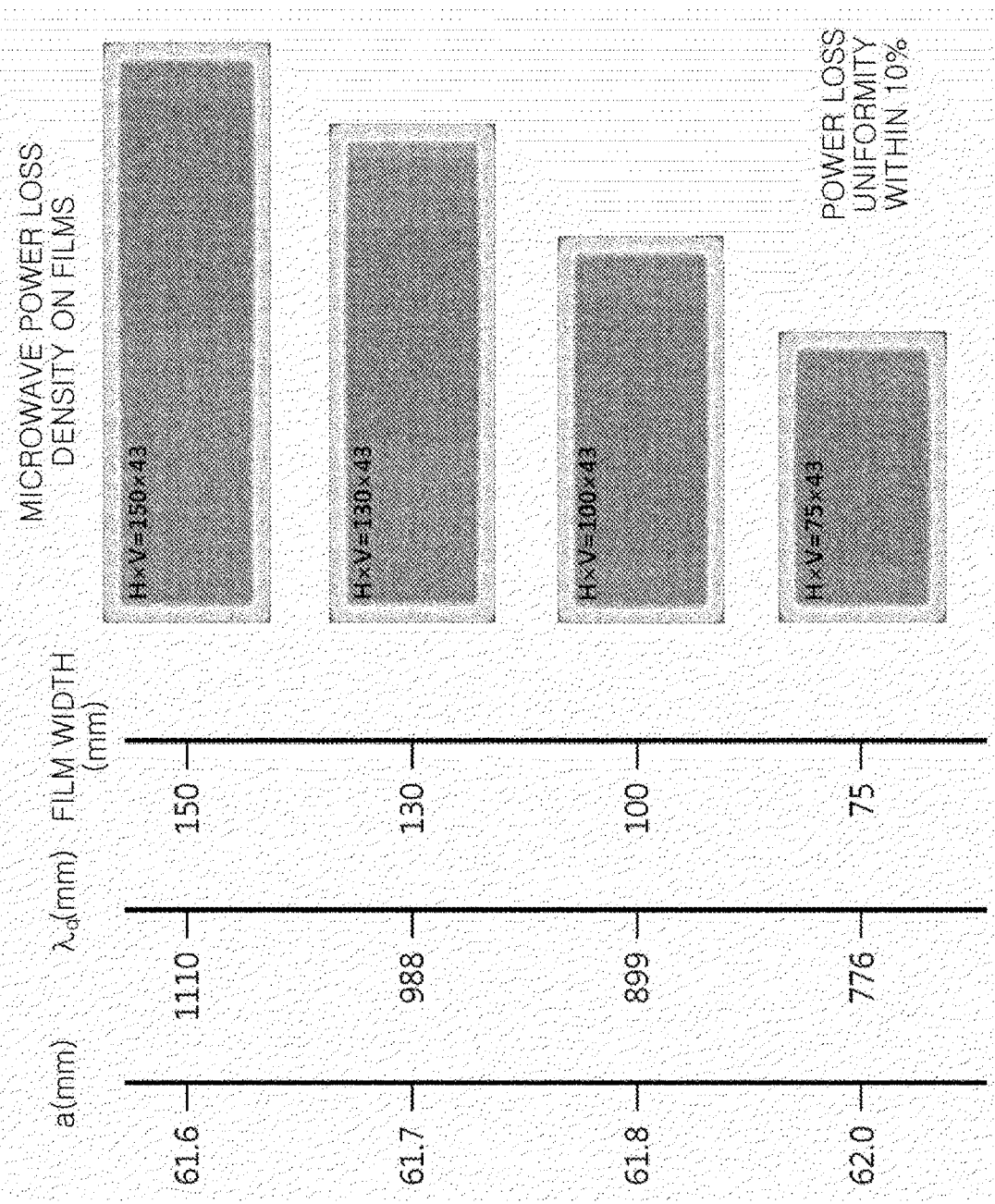
FIG. 5 is a diagram showing the analysis results of simulation to describe the uniformity of power loss in a target related to the transverse length of a waveguide, the wavelength of a microwave within the waveguide, and the width of the target.

In order to utilize such a principle, the wavelength controller 11 according to the present invention is provided in the waveguide 10 to occupy a certain space within the waveguide 10, and is made of a solid material (e.g., a material such as metal), thus reducing a transverse (x direction) space through which the microwave passes, as shown in FIG. 1, with the result that the wavelength of the microwave traveling into the reduced space 22 may be lengthened via the above-described near-cutoff principle. Accordingly, since ¼ of the microwave wavelength may be longer than the z direction length of the target, heating uniformity may be increased so that the target is uniformly heated for individual longitudinal (z direction) locations of the target. As shown in FIG. 5, as a result of analyzing the simulation of power loss uniformity in the target by changing (e.g., range from 75 to 150 mm) the z direction width (film width) of the target with respect to the transverse length (a) of the waveguide 10 and the wavelength $\lambda_g$ of the microwave within the waveguide 10, variations in power loss for individual longitudinal (z direction) locations of each target (film) are within 10% to exhibit uniform characteristics, and it is proved, even based on the results of uniform characteristics, that the target may be uniformly heated, as described above.

Meanwhile, as shown in FIG. 1, the wavelength controller 11 may be manufactured to include an inclined surface-shaped matching area 21 or 23 at the longitudinal (z direction) front or rear end of the wavelength controller. That is, if the wavelength controller 11 is simply formed in the shape of a rectangular parallelepiped, the microwave may be reflected from the entrance-side surface of the wavelength controller 11 (front surface in the longitudinal direction (z direction)), and thus interference with propagation of the microwave into the reduced space 22 may occur. Further, even the microwave reflected from the reflecting plate 12 is operated on the rear surface of the wavelength controller 11 in the longitudinal direction (z direction) in the same manner as above. Therefore, the inclined surface-shaped matching area 21 or 23 for gradually reducing a transverse space is included at the front or rear end of the wavelength controller 11 in the longitudinal direction (z direction), so that the reflection of a microwave incident on the inlet of the waveguide 10 or reflected from the reflecting plate 12 is reduced, thus improving the transmissibility of the microwave.

Meanwhile, the above-described wavelength controller 11 may be integrated into the waveguide 10 as a part of the inner wall of the waveguide 10. That is, the wavelength controller 11 may be designed such that one wall of the waveguide 10 has a protrusion with a shape of the waveguide controller 11. Thus a target may be inserted into a space (wavelength control space) between the protrusion and an opposite wall and may then be heated. Such a wavelength control space functions as the above-described space 22 transversely reduced by the wavelength controller 11, and may exhibit the effect of lengthening the wavelength of a microwave within the corresponding wavelength control space depending on the above-described near-cutoff condition. Even in this case, in order to reduce the reflection of a microwave traveling into the waveguide 10, and improve the transmissibility of the microwave, the protrusion integrated into the waveguide 10 may include an inclined surface-shaped matching area for gradually reducing a transverse space at the longitudinal front or rear end of the protrusion in a shape similar to that of the matching area 21 or 23 of the above-described wavelength controller 11.

Figure 6:
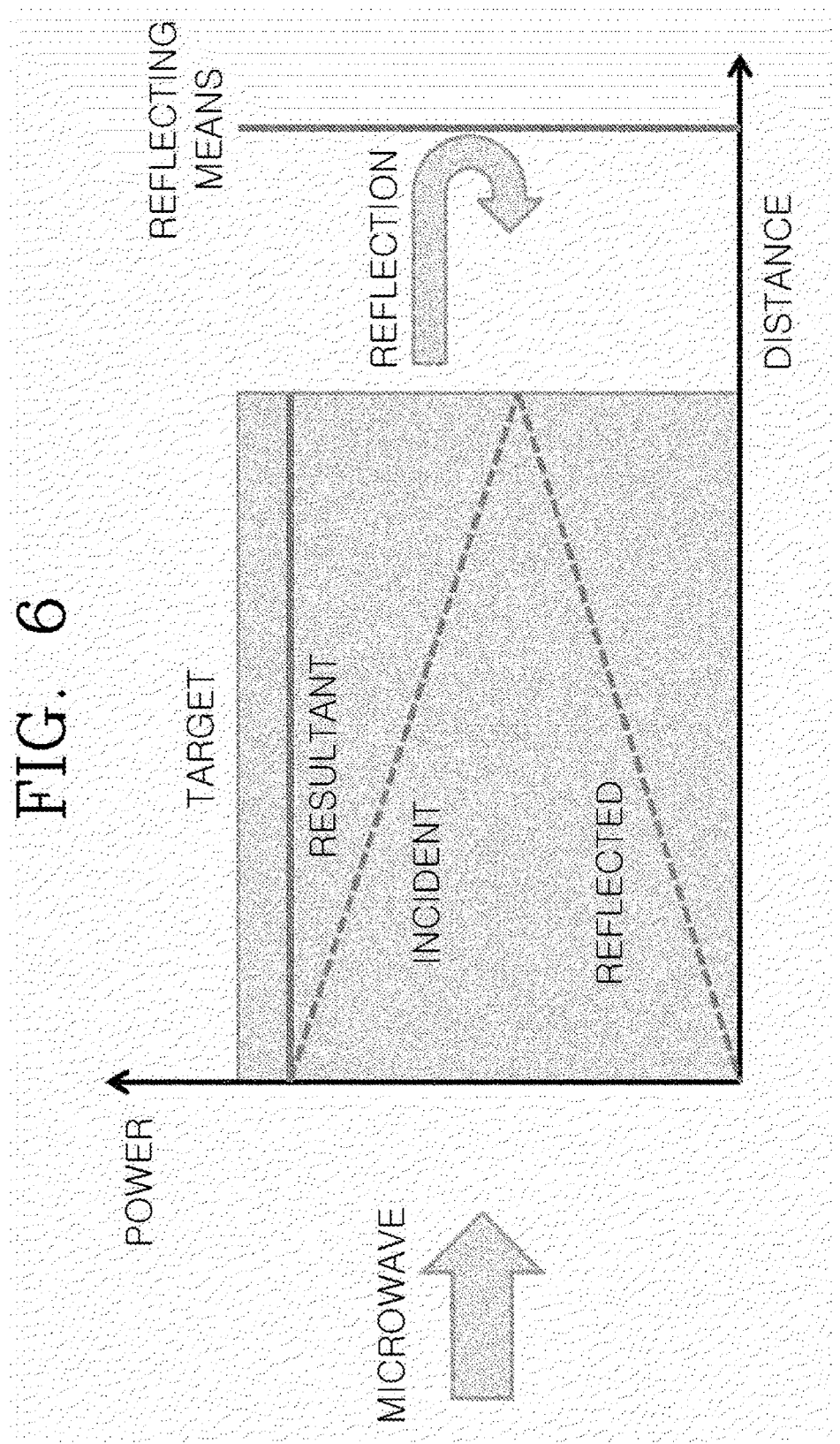
FIG. 6 is a diagram showing the effects of the reflecting plate of FIG. 3.

FIG. 6 is a diagram showing the effect of the reflecting plate 12 of FIG. 3. The reflecting plate 12 may be made of a material such as metal or a dielectric having a predetermined dielectric constant, and may be manufactured in the shape of a plate, a bar or a block. Such a reflecting plate 12 functions to reflect the microwave output from the wavelength control space 22 reduced by the wavelength controller 11 and to propagate the microwave back towards the target in the wavelength control space 22. Accordingly, differences in attenuated power of a microwave for the individual locations of the target are compensated for, thus improving heating uniformity for the individual locations of the target. For example, as shown in FIG. 6, as a microwave incident on the inlet of the waveguide 10 travels to the target and heats the target, the power of the microwave is gradually decreased (in FIG. 6, Incident Power) due to power loss depending on the individual longitudinal (z direction) locations of the target. Accordingly, if the microwave is reflected by the reflecting plate 12, the reflected microwave again passes through the target and power loss occurs again in the target (in FIG. 6, Reflected Power). Accordingly, the sum of power loss of the incident microwave and the power loss of the reflected microwave may be similar or constant to each other for individual longitudinal (z direction) locations of the target (resultant power loss in FIG. 6). Therefore, differences between heating degrees for respective locations of the target may be removed, and thus uniform heating of the target may be achieved.

Figure 7:
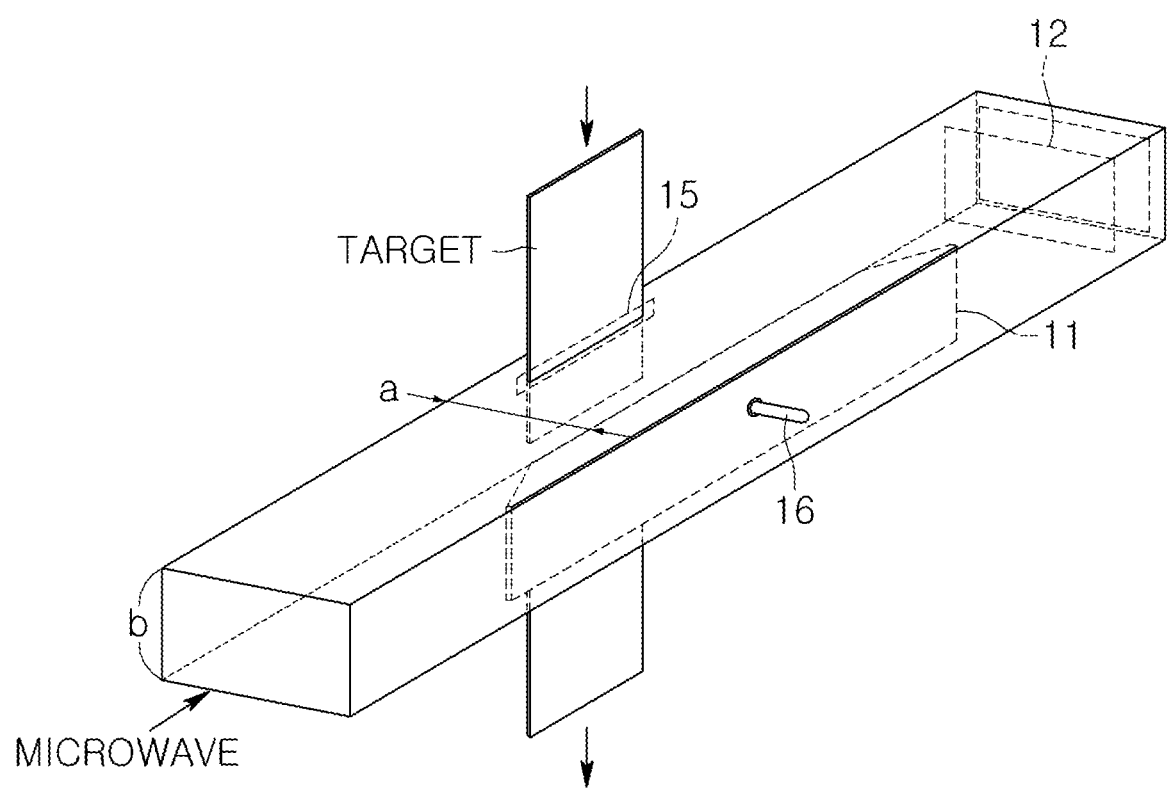
FIG. 7 is a diagram showing the wavelength controller, the reflecting plate, and the target transfer slit of FIG. 3.

FIG. 7 is a diagram showing the wavelength controller 11, the reflecting plate 12, and the target transfer slit 15 of FIG. 3.

The above-described wavelength controller 11 may be fixedly arranged within the waveguide 10, but may include a location control means 16 that is attached to one side surface of the wavelength controller 11 and that protrudes outwards from the waveguide 10, as shown in FIG. 7, if the wavelength controller is not an integrated with the waveguide 10. By using the location control means 16, the transverse length (a) of a space 22 through which a microwave passes may be adjusted. For example, the wavelength controller 11 may be moved within the waveguide 10 in a transverse direction (x direction) by, for example, pushing or pulling the location control means 16 either manually or using a mechanical device (motor or the like). Accordingly, by increasing or decreasing the wavelength control space 22 through which the microwave passes, the wavelength of the microwave in the space may be adjusted to have any suitable wavelength value falling within the range of the near-cutoff condition. In this case, the wavelength controller 11 may be moved from the inner wall of the waveguide 10 only a predetermined distance in the transverse direction (x direction). Here, a gap (space) between the inner wall of the waveguide 10 and the wavelength controller 11 may be formed, but, if the length of the gap is less than or equal to ½ of the free space wavelength of the microwave, there is no concern that the microwaves will pass through the gap.

Meanwhile, the above-described reflecting plate 12 may be fixedly arranged at a location spaced apart from the wavelength controller 11 by a predetermined distance in a longitudinal direction (z direction) so as to reflect the microwave, output after passing through the target in the space 22 in which the microwave passes, towards the target. However, as shown in FIG. 7, a plate-shaped reflecting plate 12 may be operated to reciprocate forwards and backwards along the longitudinal direction (z direction) by a predetermined distance while the target is heated using the microwave. The reflecting plate 12 may repetitively reciprocate forwards and backwards by a preset distance along a predetermined guideline (rail or the like) within the waveguide 10 using a mechanical device (motor or the like). Accordingly, intensity at which the reflected microwave is incident on the target may be uniform on average, so that differences between the heating degrees for the respective locations of the target are removed, thus more uniformly heating the target.

Figure 8A:
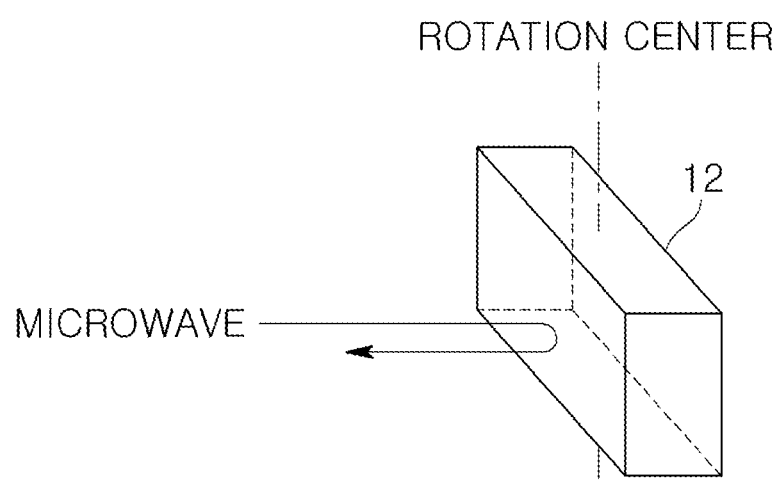
FIGS. 8A and 8B are diagrams showing the operation form of the reflecting plate of FIG. 3.
Figure 8B:
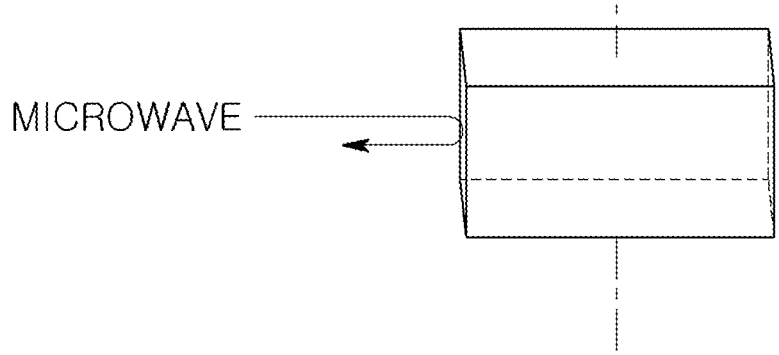

In addition, as shown in FIGS. 8A and 8B, the reflecting plate 12 may be operated to be rotated around a rotation center as a shaft at a fixed location. For this operation, the reflecting plate 12 may be rotated around the rotation shaft using a mechanical device (motor or the like).

For example, while the target is heated using a microwave, the bar-shaped or block-shaped reflecting plate 12 reciprocates and rotates at a preset angle, and an increase and a decrease in the distance between the target and the corresponding reflective surface of the reflecting plate 12 are repeated, thus causing intensity at which the reflected microwave is incident on the target to be uniform on average. In this way, the reflecting plate 12 may be operated to reciprocate and rotate at a preset angle (e.g., 30°, 60°, etc.), but is not limited thereto. It is also possible to operate the reflecting plate 12 so that the reflecting plate 12 is repeatedly and fully rotated at an angle of 360°, and thus an increase and a decrease in the distance between the reflective surface of the reflecting plate 12 and the target are repeated (the distance between the reflective surface and the target in state of FIG. 8A and the distance between the reflective surface and the target in state of FIG. 8B are alternately changed), with the result that the target may be uniformly heated.

Meanwhile, as shown in FIG. 7, a slit 15 formed to communicate with the inside of the waveguide 10 may be included in the waveguide 10. A plate-shaped, film-shaped or sheet-shaped target may be pushed in or withdrawn from the waveguide 10 through the slit 15. For example, although not shown in the drawing, an output slit may also be formed in the opposite surface of the waveguide 10 in addition to the slit (input slit) 15 formed in the top surface of the waveguide. That is, the target is pushed in the waveguide through the input slit and the target heated within the waveguide 10 may be withdrawn from the waveguide 10 through the output slit, either manually or using a mechanical device.

For example, the plate-shaped, film-shaped or sheet-shaped target may be prepared in the shape of a roll, and an operatic operation may be performed such that the roll-shaped target is automatically pushed in the waveguide through the input slit on a predetermined length basis using a mechanical device (e.g., motor or the like), and such that, after the target has been heated within the waveguide 10 for a predetermined period of time according to the heating condition, a heated portion of the target is withdrawn from the waveguide through the output slit. Alternatively, the plate-shaped, film-shaped or sheet-shaped target may be prepared in the shape of a roll, and an automatic operation may be performed such that the roll-shaped target is continuously pushed in the waveguide at a constant speed through the input slit, and such that the heated target is continuously withdrawn from the waveguide through the output slit.

The above-described target may be any of various heating targets, such as paper, food or a dielectric that may be heated by dielectric loss or Joule heat. Further, the target may be a powdered target placed on a predetermined transfer means (e.g., a conveyer belt or the like). In particular, since the target may effectively exhibit the advantage of, when the transverse (x direction) thickness of the waveguide is reduced, lengthening the wavelength of a microwave depending on the near-cutoff condition, the thickness of the target is preferably set to a value less than or equal to ⅛ of the free space wavelength $\lambda_0$ of the microwave.

For example, the target has a plate-shaped, film-shaped, or sheet-shaped target including a conductor applied to a substrate, and the above-described microwave heating apparatus may be used to heat the target so as to improve the adhesive properties or environmental resistance properties of the of the applied conductor. Here, the substrate may be made of any one selected from the group consisting of a polyester-based polymer, a polycarbonate-based polymer, a polyethersulfone-based polymer, an acrylic-based polymer, and a polyethylene terephthalate-based polymer. The above-described conductor may be made of any one selected from the group consisting of a nano-carbon-based material, a nano-metal-based material, and a hybrid material of nano-carbon and a metal oxide. The above conductor may have a shape in which a conductor is applied to the entire surface of the substrate without requiring patterned lines, or may have a shape in which patterned lines are applied to the substrate, as in the case of metal patterns on a Flexible Printed Circuit (FPC), depending on the circumstances.

Figure 9:
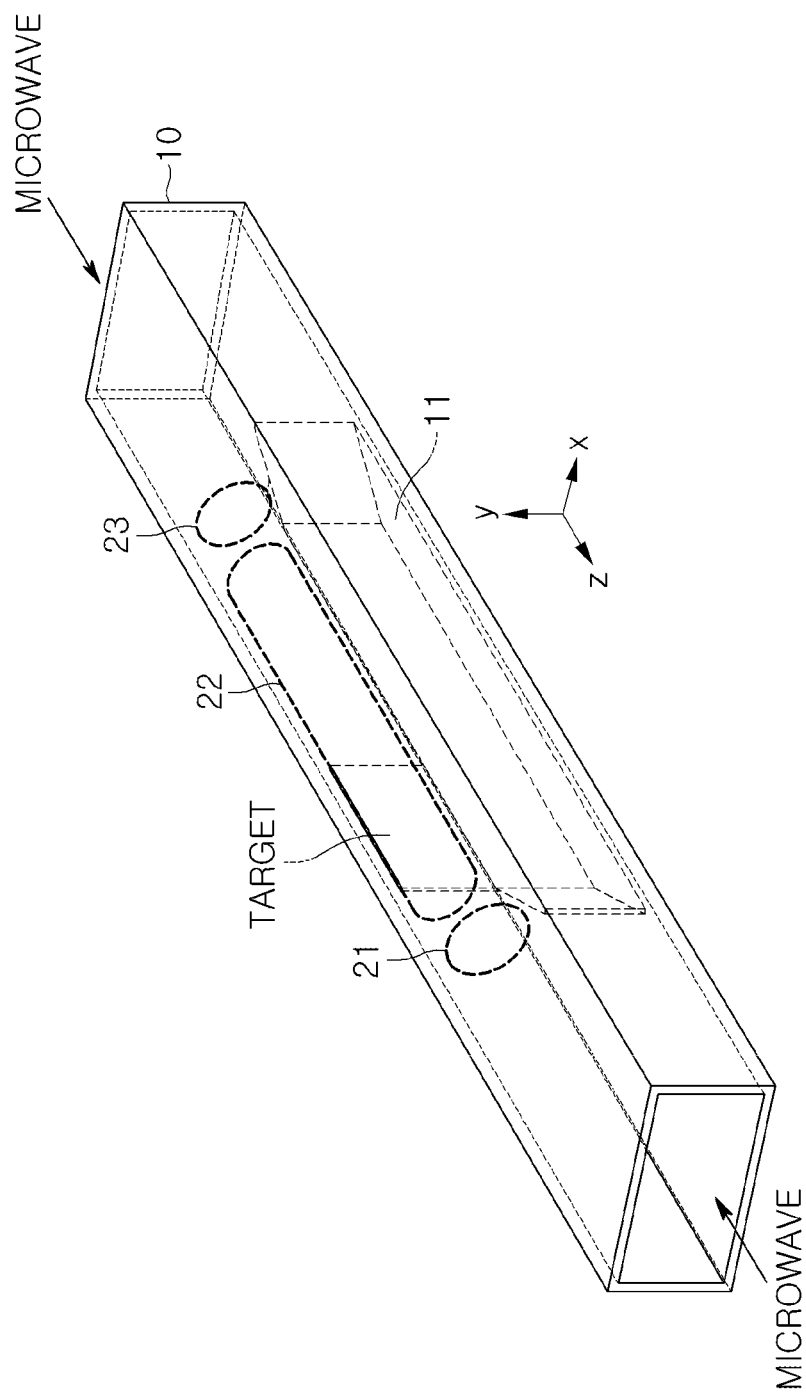
FIG. 9 is a diagram showing a scheme for causing a microwave to be incident even on an opposite side of a waveguide without using the reflecting plate of FIG. 3.
Figure 16:
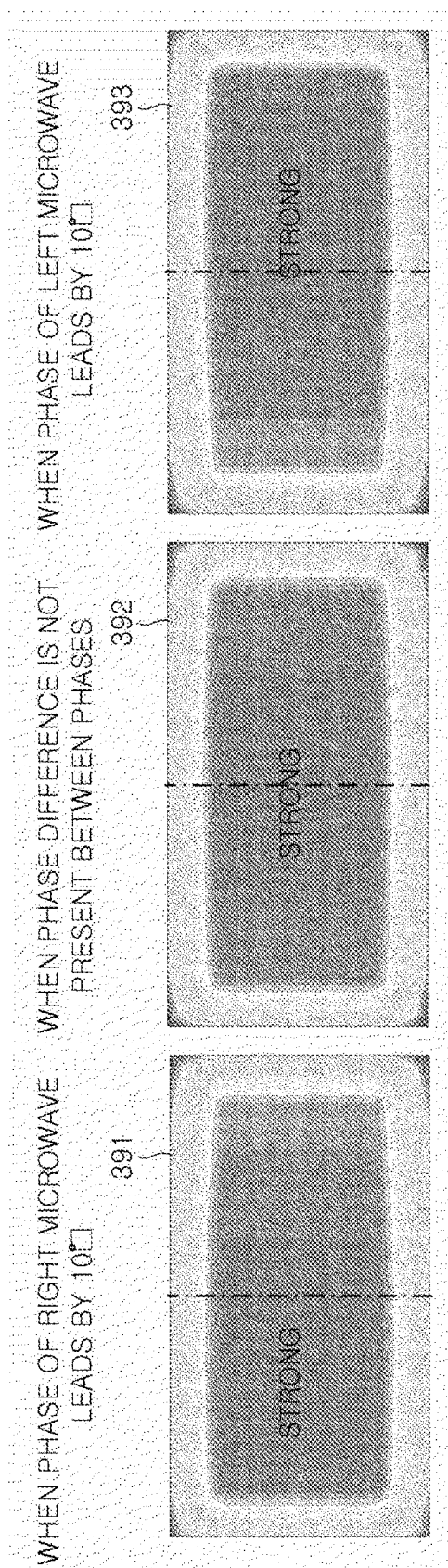
Figure 17:
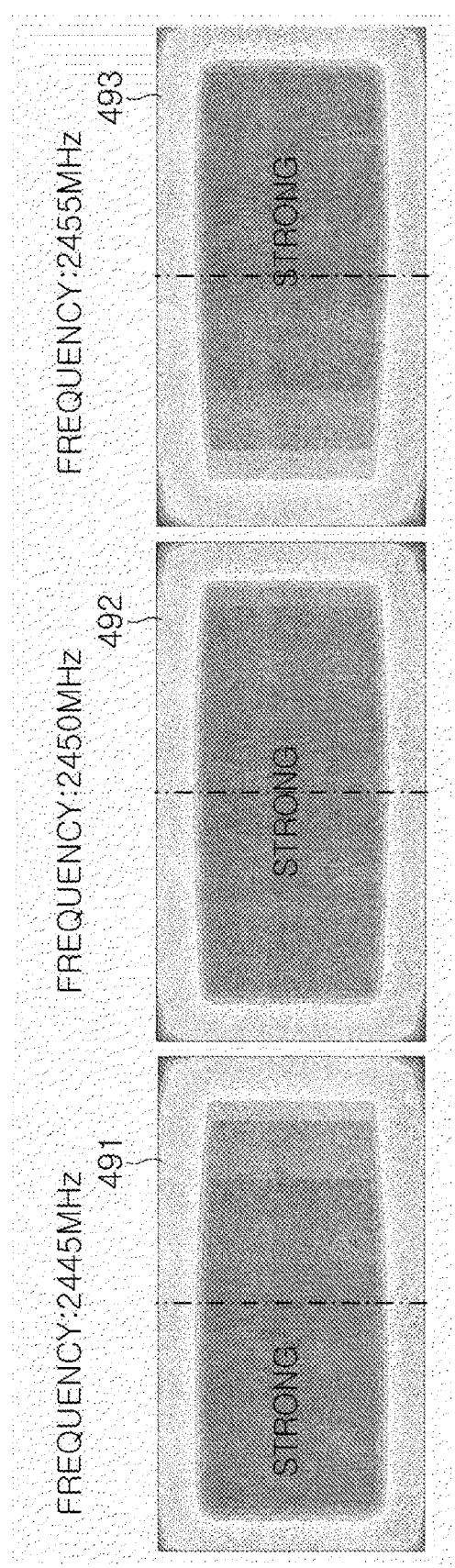

Meanwhile, as described above, a microwave may be incident on one inlet of the waveguide 10 under a near-cutoff condition and may uniformly heat the target. However, as shown in FIG. 9, microwaves may be incident on longitudinal opposite inlets of the waveguide 10 and may uniformly heat the target. Here, FIGS. 10 to 15 illustrates various schemes for causing microwaves to be incident on the longitudinal opposite inlets of the waveguide 10, instead of the reflecting plate 12, and simultaneously implementing phase control performed by changing the amplitude, phase or frequency of one or more of two microwaves and wavelength control performed via the wavelength control space 22, thus enabling a function similar to that of the reflecting plate 12 and uniformly heating the target. In addition, FIGS. 16 and 17 illustrate schemes in which a microwave is incident on one inlet of the waveguide 10 under a near-cutoff condition and in which phase control performed by changing the frequency of the microwave and wavelength control performed via the wavelength control space 22 are simultaneously implemented, thus uniformly heating the target.

Figure 10:
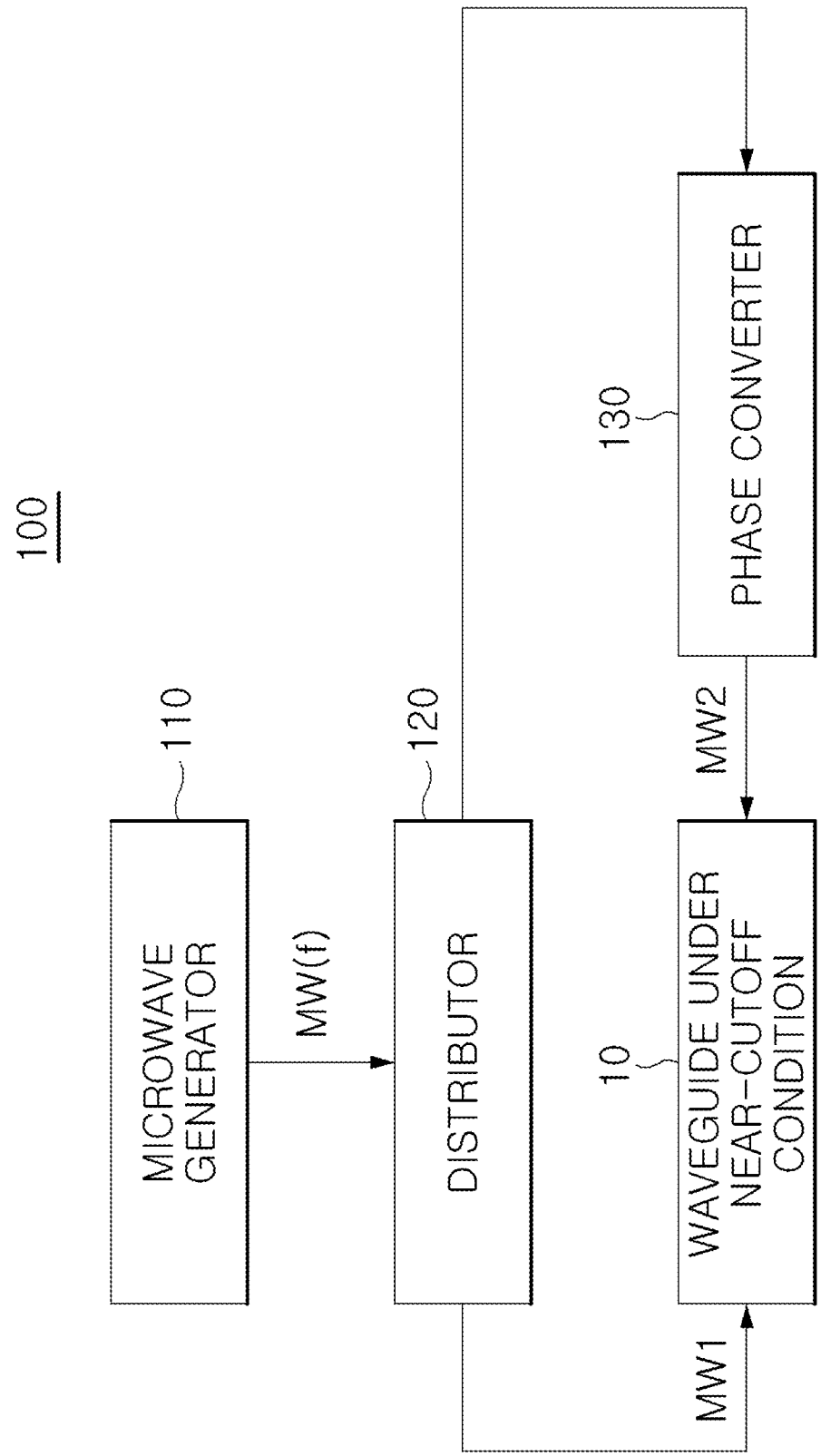
FIG. 10 is a diagram showing another embodiment of a microwave heating apparatus including an additional circuit for causing microwaves to be incident on the waveguide of FIG. 3.

FIG. 10 is a diagram showing another embodiment of a microwave heating apparatus including an additional circuit for causing microwaves to be incident on the waveguide 10 of FIG. 3.

Referring to FIG. 10, a microwave heating apparatus 100 according to another embodiment of the present invention may include a microwave generator 110, a distributor 120, and a phase converter 130 in addition to a reflecting plate 12-free waveguide 10 under a near-cutoff condition.

The microwave generator 110 generates a microwave (MW(f)) having a predetermined frequency (f), and the distributor 120 generates a first microwave MW1 and a second microwave, having the same amplitude and the same frequency, from the microwave MW(f) generated by the microwave generator 110. The distributor 120 causes the first microwave MW1 to be incident on the wavelength control space 22 through one inlet of the waveguide 10. The phase converter 130 controls the phase of the second microwave within a predetermined range, and then causes a phase-controlled second microwave MW2 to be incident on the wavelength control space 22 through the other inlet of the waveguide 10.

Phase converters may be installed on opposite sides of the waveguide 10. However, even if the phase converter 130 is installed only on one side in this way, the effect of obtaining a difference between the phases of the first microwave MW1 and the phase-controlled second microwave MW2 may be realized similar to the reflecting plate 12, and thus the target may be uniformly heated using a simpler method.

Figure 11:
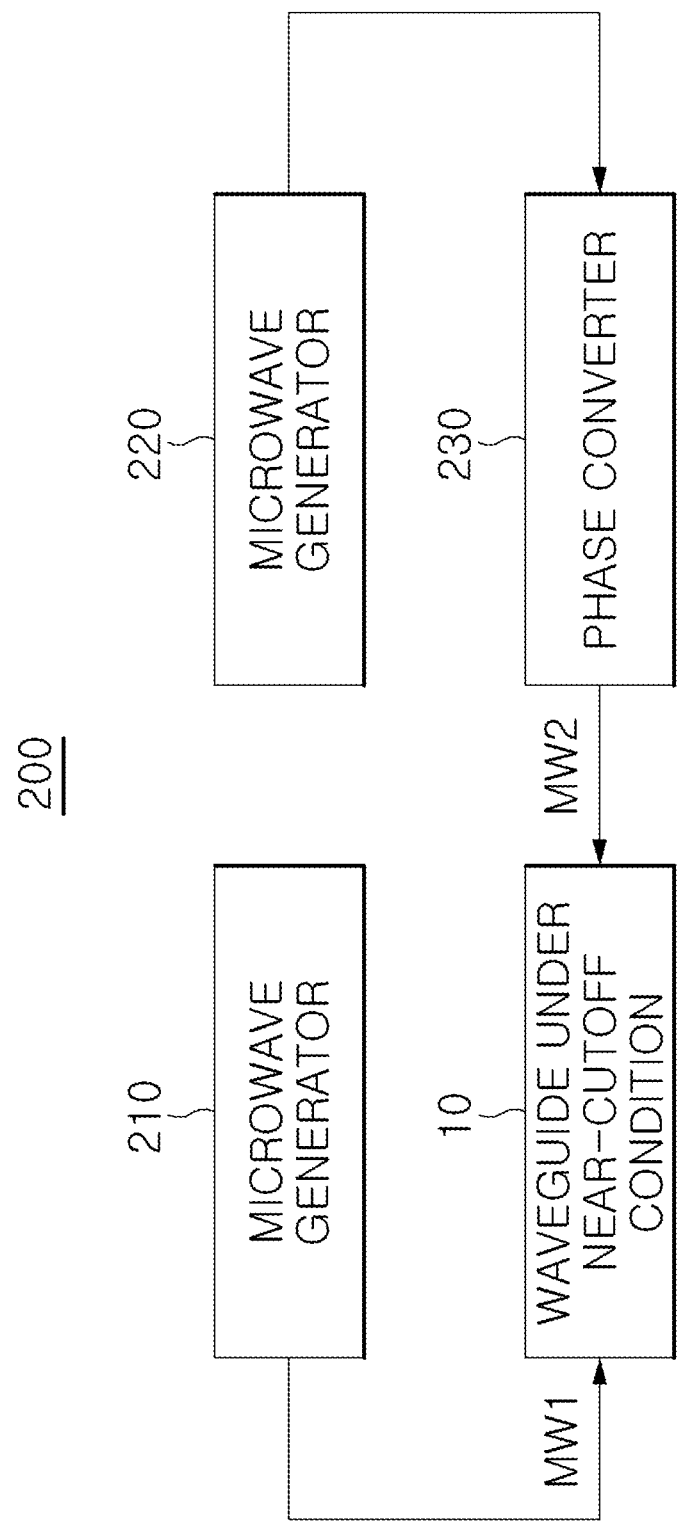
FIG. 11 is a diagram showing a further embodiment of a microwave heating apparatus including another additional circuit for causing microwaves to be incident on the waveguide of FIG. 3.

FIG. 11 is a diagram showing a further embodiment of a microwave heating apparatus including another additional circuit for causing microwaves to be incident on the waveguide of FIG. 3.

Referring to FIG. 11, a microwave heating apparatus 200 according to the further embodiment of the present invention may include a first microwave generator 210, a second microwave generator 220, and a phase converter 230, in addition to a reflecting plate 12-free waveguide 10 under a near-cutoff condition.

The first microwave generator 210 generates a first microwave MW1 having a predetermined frequency and causes the first microwave MW1 to be incident on the wavelength control space 22 through one inlet of the waveguide 10. The second microwave generator 220 generates a second microwave having a predetermined frequency, and the phase converter 230 controls the phase of the second microwave within a predetermined range and causes a phase-controlled second microwave MW2 to be incident on the wavelength control space 22 through the other inlet of the waveguide 10.

Phase converters may be installed on opposite sides of the waveguide 10. However, even if the phase converter 230 is installed only on one side in this way, the effect of obtaining a difference between the phases of the first microwave MW1 and the phase-controlled second microwave MW2 may be realized similar to the reflecting plate 12, and thus the target may be uniformly heated using a simpler method.

Depending on the circumstances, the first microwave generator 210 may change and output the amplitude (power intensity) or frequency of the first microwave MW1, and the second microwave generator 220 may change and output the amplitude (power intensity) or frequency of the phase-controlled second microwave MW2.

Figure 12:
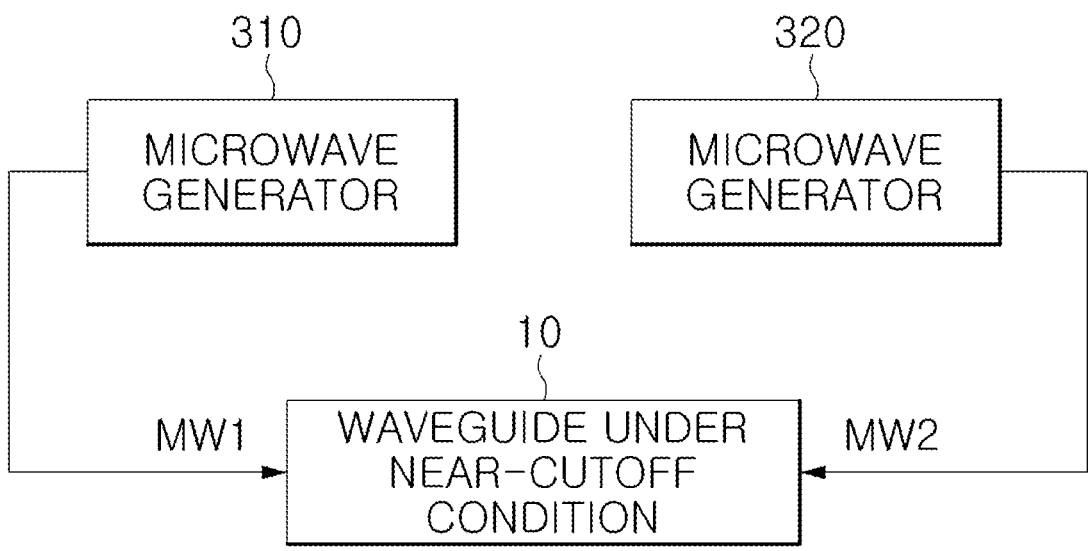
FIG. 12 is a diagram showing yet another embodiment of a microwave heating apparatus including a further additional circuit for causing microwaves to be incident on the waveguide of FIG. 3.

FIG. 12 is a diagram showing yet another embodiment of a microwave heating apparatus including a further additional circuit for causing microwaves to be incident on the waveguide of FIG. 3.

Referring to FIG. 12, a microwave heating apparatus 300 according to yet another embodiment of the present invention may include a first microwave generator 310 and a second microwave generator 320, in addition to a reflecting plate 12-free waveguide 10 under a near-cutoff condition.

The first microwave generator 310 generates a first microwave MW1 and causes the first microwave MW1 to be incident on the wavelength control space 22 through one inlet of the waveguide 10. The second microwave generator 320 generates a second microwave MW2 and causes the second microwave MW2 to be incident on the wavelength control space 22 through the other inlet of the waveguide 10.

The first microwave generator 310 may change the amplitude (power intensity) or frequency of the first microwave MW1 or, alternatively, the second microwave generator 320 may change the amplitude (power intensity) or frequency of the second microwave MW2. In particular, phase control may be performed using the effect of changing the phase by controlling the frequency of any one microwave within a predetermined range at the same time at which the wavelength is controlled via the wavelength control space 22, thus enabling the target to be uniformly heated.

Figure 13:
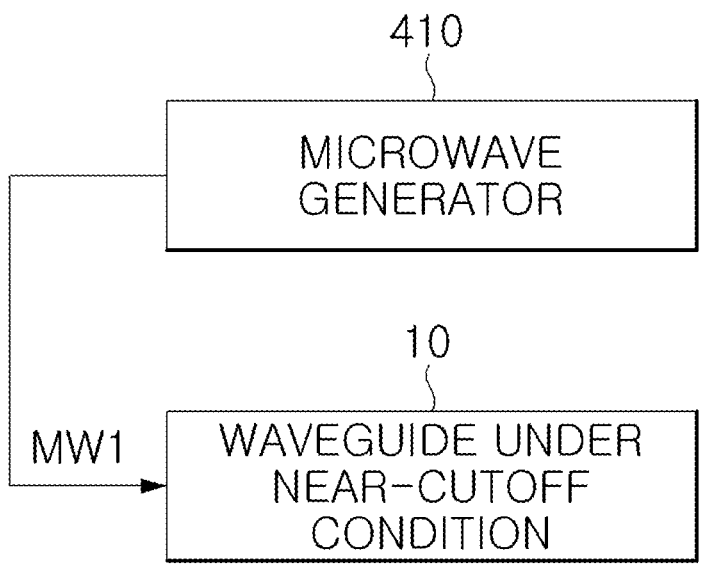
FIG. 13 is a diagram showing still another embodiment of a microwave heating apparatus including yet another additional circuit for causing a microwave to be incident on the waveguide of FIG. 3.

FIG. 13 is a diagram showing still another embodiment of a microwave heating apparatus including yet another additional circuit for causing a microwave to be incident on the waveguide of FIG. 3.

Referring to FIG. 13, a microwave heating apparatus 400 according to still another embodiment of the present invention may include a microwave generator 410 in addition to a waveguide 10 under a near-cutoff condition.

Here, an embodiment in which only one microwave generator 410 is used is illustrated, wherein the microwave generator 410 generates a microwave MW1 and causes the microwave MW1 to be incident on the wavelength control space 22 through the inlet of the waveguide 10. In this case, the reflecting plate 12, which has been described with reference to FIGS. 6 to 8, may be arranged on the opposite side of the waveguide 10 on which the microwave MW1 is incident on the inlet thereof. The reflecting plate 12 may reflect back the microwave MW1 having passed through the wavelength control space 22 towards the wavelength control space 22.

In this way, even if only the single microwave generator 410 is used, the microwave generator 410 may change the amplitude (power intensity) or frequency, and, in particular, phase control based on the effect of phase change depending on a change in frequency and wavelength control based on the wavelength control space 22 may be simultaneously performed, thus enabling the target to be uniformly heated. That is, the microwave MW1 output from the wavelength control space 22 is reflected by the reflecting plate 12 and is caused to travel back towards the target in the wavelength control space 22, thus compensating for differences in the attenuated power of the microwave in the target (see description of FIG. 6), and improving heating uniformity for individual locations of the target.

FIGS. 14 to 17 are diagrams showing the analysis results of simulation to describe the uniformity of power loss in a target depending on the additional circuits of FIGS. 10 to 13.

Figure 14:
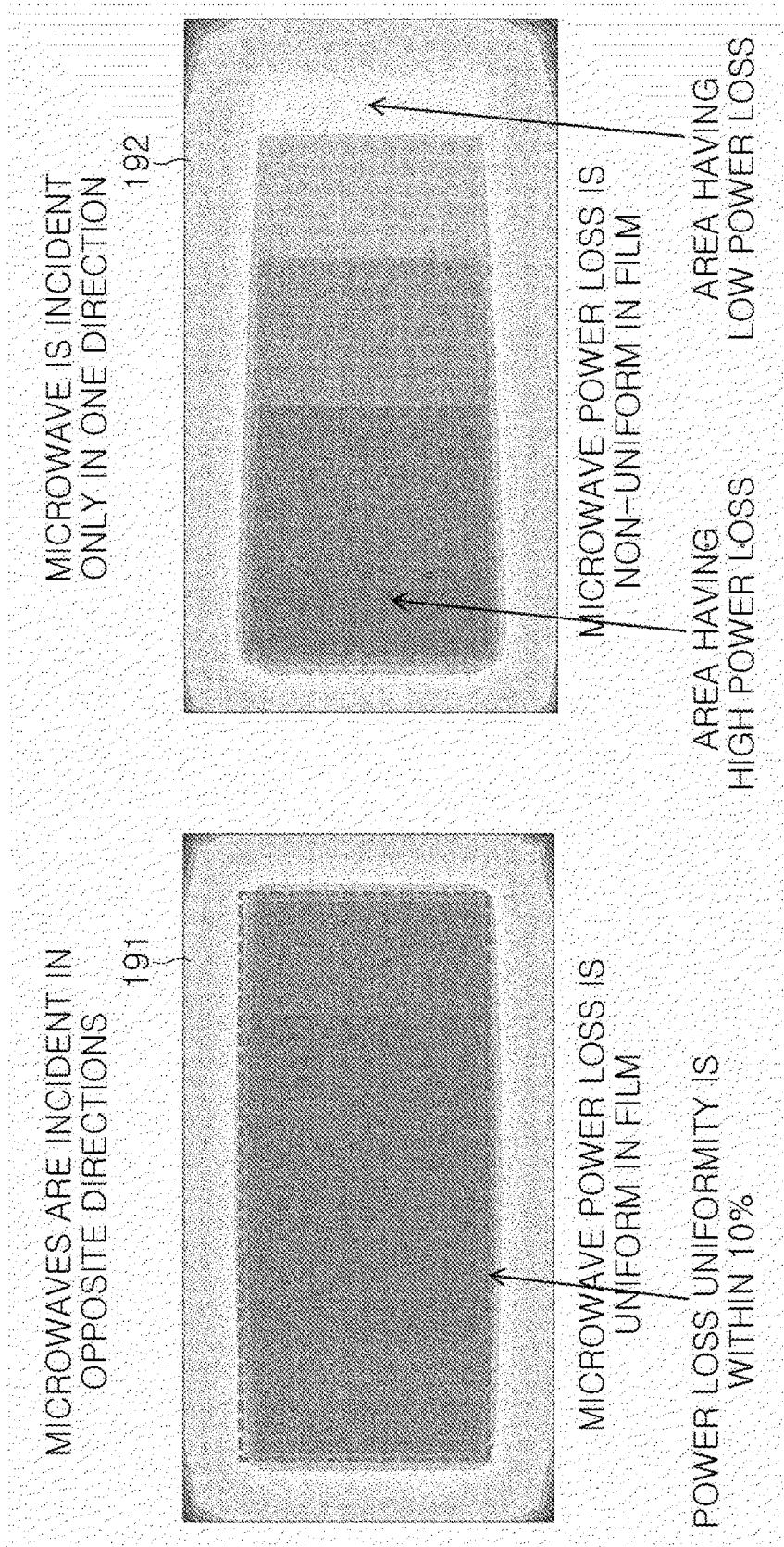
FIGS. 14 to 17 are diagrams showing the analysis results of simulation to describe the uniformity of power loss in a target depending on the additional circuits of FIGS. 10 to 13.

First, when a film-shaped target having a predetermined area is heated, when a microwave is incident on the waveguide 10 only in one direction, as indicated by reference numeral 192 of FIG. 14, a difference in power loss may greatly increase depending on individual locations in the z direction width (film width) of the target. However, when microwaves are incident on opposite sides of the waveguide 10 (e.g., a=62 mm), or when the reflecting plate 12 is used, as shown in FIGS. 10 to 13, it can be seen that changes in power loss for individual longitudinal (z direction) locations of the target (film) are within 10% to exhibit uniform characteristics, as indicated by reference numeral 191 of FIG. 14.

Figure 15:
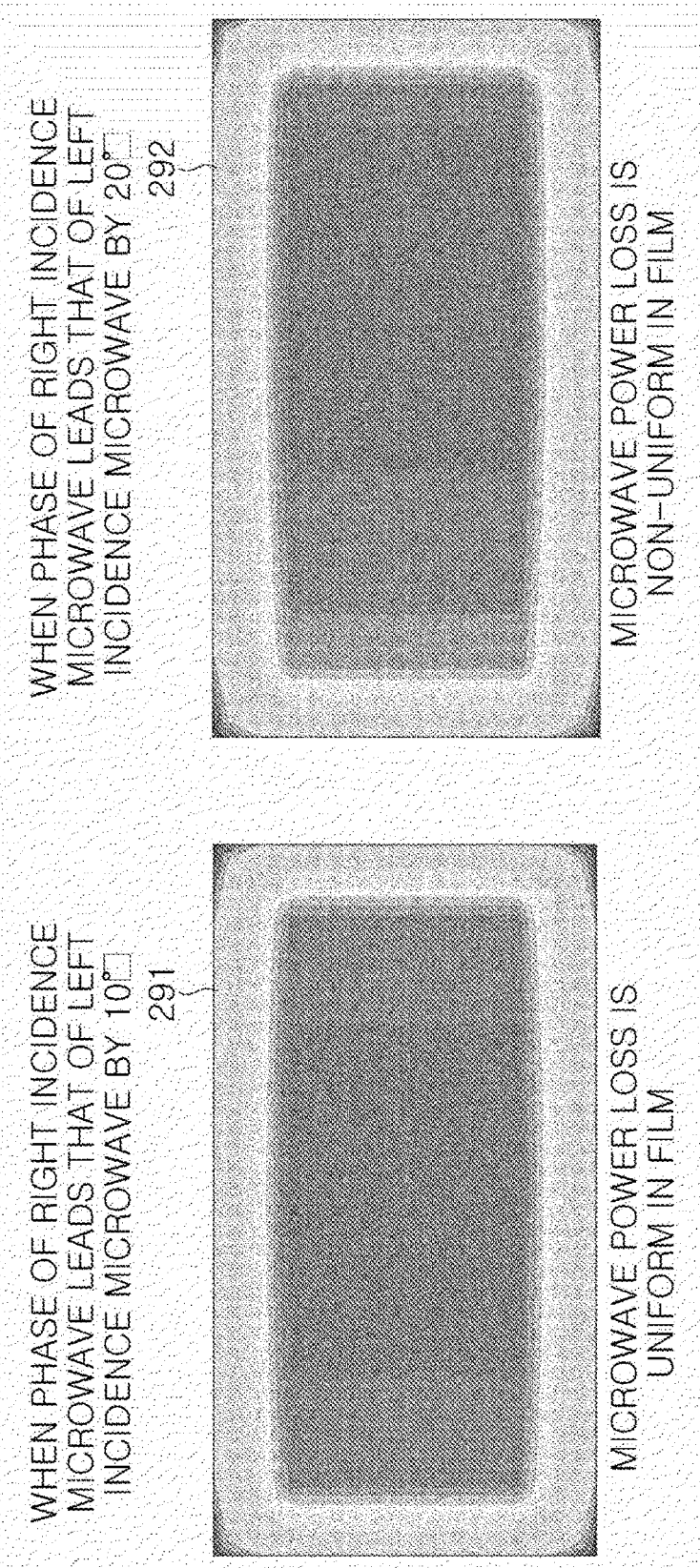

Further, when the microwave heating apparatus having the configuration of FIGS. 10 to 12 is used to cause microwaves to be incident on opposite sides of the waveguide 10 (e.g., a=62 mm) so that the power of a microwave incident on the left side of the waveguide 10 is twice that of a microwave incident on the right side thereof, it can be seen that changes in power loss for individual longitudinal (z direction) locations of the target (film) may exhibit uniform characteristics in a case where the phase of the right microwave leads that of the left microwave by 10°, as indicated by reference numeral 291 of FIG. 15, rather than a case where the phase of the right microwave leads that of the left microwave by 20°, as indicated by reference numeral 292 of FIG. 15. Further, it can be seen that the intensities of the power of microwaves are not greatly influenced, and the target (film) may be uniformly heated by controlling a difference between the phases of opposite microwaves.

Further, when the microwave heating apparatus having the configuration of FIGS. 10 to 12 is used, and a difference between the phases of microwaves incident on opposite sides of the waveguide 10 (e.g., a=62 mm) is repeatedly controlled within a predetermined range, the target (film) may be uniformly heated by compensating for non-uniformity for each location occurring in any one phase difference with another phase difference by repeating a case where the phase of a right microwave leads that of a left microwave (391), a case where a phase difference is not present between the microwaves (392), and a case where the phase of the left microwave leads that of the right microwave (393), as shown in FIG. 16.

Furthermore, even when the microwave heating apparatus having the configuration of FIGS. 10 to 12 is used and the frequencies of one or two of opposite microwaves are controlled so as to repeatedly control the difference between the phases of microwaves incident on opposite sides of the waveguide 10 (e.g., a=62 mm) within a predetermined range, non-uniformity for each location appearing when the frequencies of microwaves are fixed at a single frequency is compensated for with another frequency difference, as shown in FIG. 17, thus enabling the target (film) to be uniformly heated. FIG. 17 illustrates non-uniformity in power loss for individual locations of the target (film) in a case where the frequency of a left microwave is fixed at 2.45 GHz, and the frequency of a right microwave is set to 2.445 GHz (491), is set to 2.450 GHz (492), and is set to 2.455 GHz (493).

Meanwhile, as described above, the microwaves may be incident on the waveguide 10 through longitudinal opposite inlets of the waveguide 10 and may uniformly heat the target. For example, microwaves are incident on the waveguide 10 through the longitudinal opposite inlets thereof and the amplitude, phase or frequency of one or more of the two microwaves is changed, so that phase control and wavelength control via the wavelength control space 22 are simultaneously performed, thus allowing any one microwave to perform a function similar to that of the reflecting plate 12, and enabling the target to be uniformly heated. Alternatively, a microwave is incident on the waveguide 10 through one inlet of the waveguide 10 under a near-cutoff condition, and the amplitude or frequency of the microwave is changed, so that phase control and wavelength control via the wavelength control space 22 are simultaneously performed, and the reflecting plate 12 is used together, thus enabling the target to be uniformly heated.

However, as shown in FIG. 7, in a structure in which a plate-shaped, film-shaped or sheet-shaped target is heated while the target is continuously pushed in the waveguide 10 and a heated portion of the target is withdrawn from the waveguide 10, through the input slit and output slit 15 formed to communicate with the inside of the waveguide 10, the microwave mode of a free space around the input and output slits 15 influences a near-cutoff condition mode within the waveguide 10. Accordingly, as shown in FIG. 18, compared to a case (510) where the input and output slits 15 are not present, in a case (520) where the input and output slits 15 are present, the heating uniformity of the target may be deteriorated.

Figure 19:
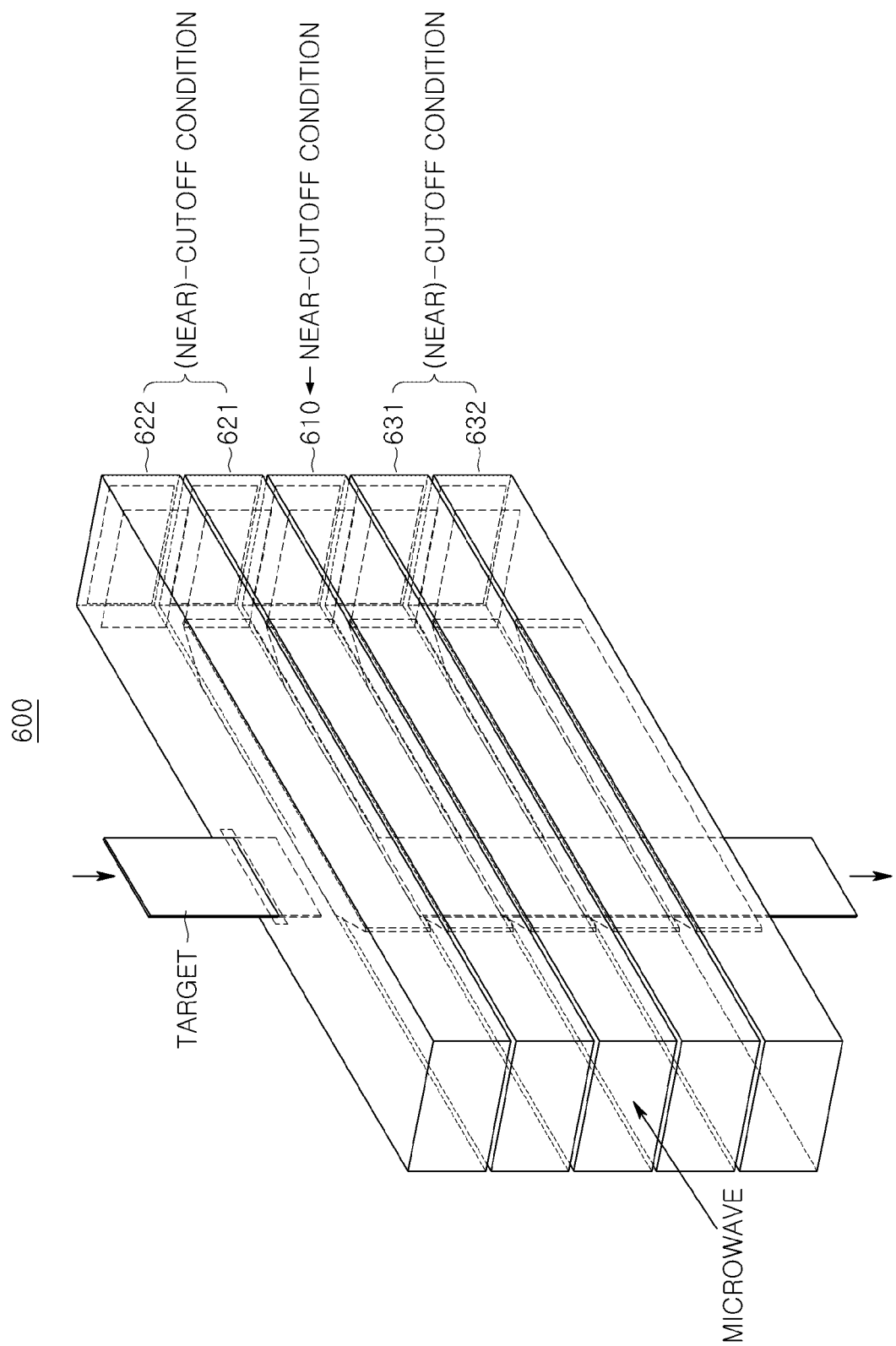
FIG. 19 is a diagram showing a microwave heating apparatus according to an additional embodiment of the present invention.

Therefore, to provide against such a case, an additional embodiment of a microwave heating apparatus 600 is proposed, as shown in FIG. 19.

Referring to FIG. 19, the microwave heating apparatus 600 according to the additional embodiment of the present invention may include not only a waveguide 610 under a near-cutoff condition corresponding to the above-described waveguide 10, but also one or more waveguides (or resonators) 621 and 622 under a near-cutoff condition or a cutoff condition, arranged on the waveguide 610, or one or more waveguides (or resonators) 631 and 632 under a near-cutoff condition or a cutoff condition, arranged under the waveguide 610. The waveguides or resonators 621/622/631/632 under the cutoff condition are typical waveguides (or resonators) for heating an internal target using microwaves, and may propagate microwaves having frequencies above a predetermined cutoff frequency (e.g., 2.450 GHz) to heat the internal target.

Figure 18:
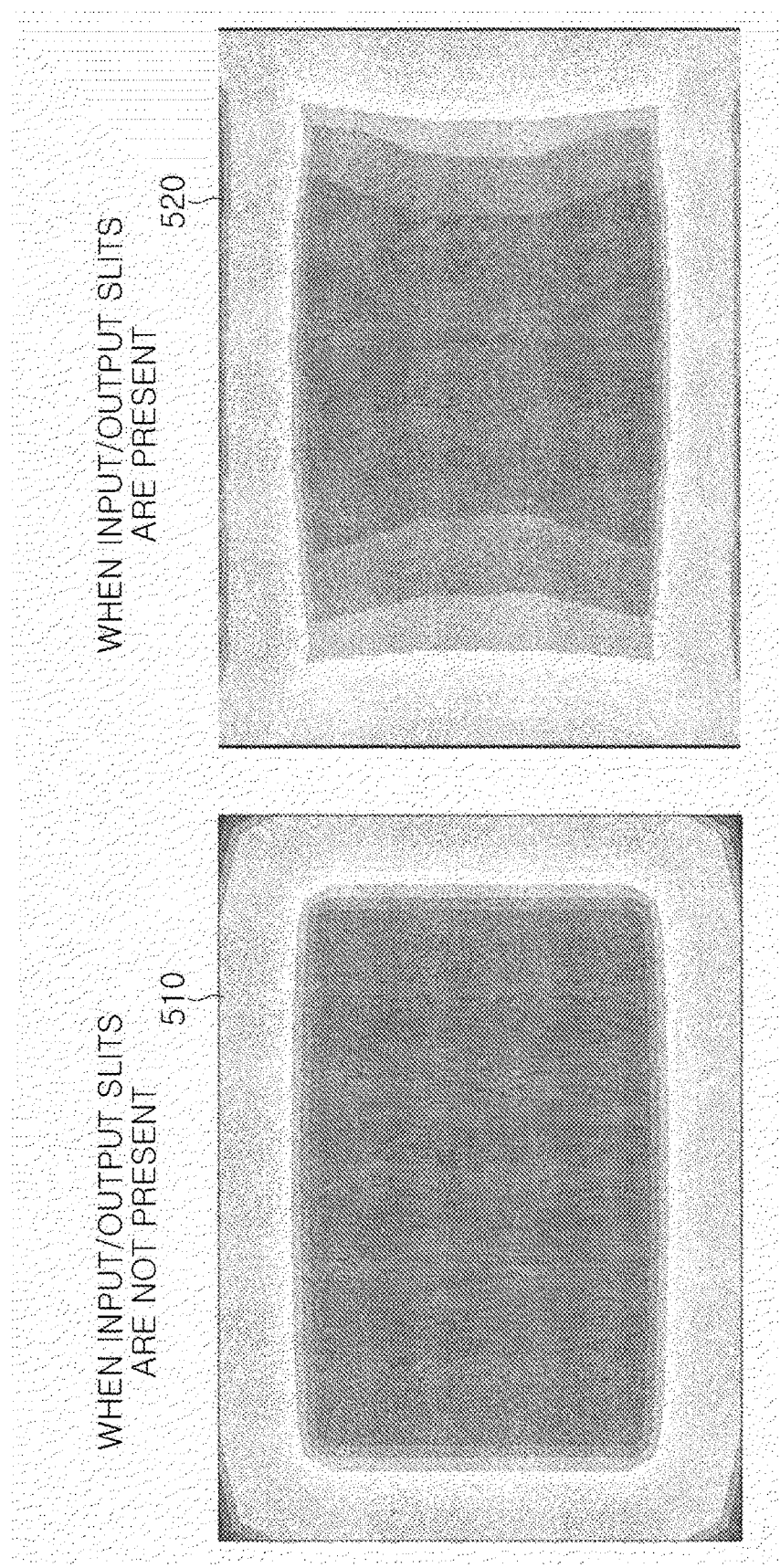
FIG. 18 is a diagram showing the analysis results of simulation to describe the heating uniformity of a target continuously inserted using the slit structure of FIG. 7.

For example, as shown in FIG. 18, a roll-shaped target may be heated while being pushed in and withdrawn from the waveguide 610 under the near-cut off condition and the waveguides (or resonators) 621, 622, 631, and 632 under the near-cutoff or cutoff condition, arranged on and under the waveguide 610, through the respective input slits and output slits thereof. In this case, an automatic operation may be performed using a mechanical device such that the roll-shaped target is pushed, on a predetermined length basis, in the waveguide 610 under the near-cut off condition and the waveguides (or resonators) 621, 622, 631, and 632 under the near-cutoff or cutoff condition, arranged on and under the waveguide 610, to pass through the input slits and output slits of the waveguides and such that the target heated for a predetermined period of time depending on the heating condition is withdrawn from the waveguides. Further, an automatic operation may be performed such that the roll-shaped target is continuously pushed in and withdrawn from the respective waveguides to pass through the respective input slits and output slits of the waveguides at a constant speed. In this case, the target passes through the wavelength control space 22 under the near-cutoff condition, and also passes through the corresponding wavelength control spaces 22 when the waveguides 621, 622, 631, and 632 are waveguides under the near-cutoff condition.

In this case, the target in each wavelength control space 22 may be heated by causing a microwave, the amplitude (power intensity) or frequency of which is changed, to be incident only on one inlet of the waveguide 610 under the near-cutoff condition or, alternatively, as shown in FIG. 9, by changing the amplitude, phase or frequency of one or more of microwaves that are respectively incident on opposite inlets of the waveguide 610 under the near-cutoff condition.

When the waveguide 621, 622, 631, or 632 is a waveguide under the cutoff condition, a microwave having a frequency above a cutoff frequency is incident on the waveguide through one inlet of the corresponding waveguide.

Further, when the waveguide 621, 622, 631, or 632 is a waveguide under the near-cutoff condition, it is possible that a microwave, the amplitude or frequency of which is changed, may be incident on the corresponding waveguide through one inlet thereof, as in the case of the waveguide 610, or that the amplitude, phase or frequency of one or more of microwaves incident on the corresponding waveguide through the opposite inlets thereof may be changed.

In addition, as described above, when a target is uniformly heated by causing a microwave to be incident on only one inlet of the waveguide 610 under the near-cutoff condition or the waveguide 621, 622, 631, or 632 under the near-cutoff condition, the reflecting plate 12 described with reference to FIGS. 6, 7, and 8, may be arranged within the waveguide 12 on the opposite side of the waveguide on which the microwave is incident through an inlet on one side thereof. The reflecting plate 12 reflects back the microwave, having passed through the corresponding wavelength control space 22, towards the wavelength control space 22. Accordingly, the microwave MW1 output from the wavelength control space 22 is reflected by the reflecting plate 12 and is propagated back towards the target in the wavelength control space 22, thus compensating for differences in the attenuated power of the microwave in the target (see description of FIG. 6) and improving heating uniformity for individual locations of the target.

In this case, a microwave, the amplitude (power intensity) or frequency of which is changed, may be incident on the corresponding waveguide under the near-cutoff condition through one inlet thereof. In this case, the amplitude (power intensity) or frequency of the corresponding microwave may be changed. In particular, by using the effect of a phase change depending on a change in frequency, phase control and wavelength control via the wavelength control space 22 are simultaneously performed, thus enabling the target to be uniformly heated.

In this case, the waveguide 610 under the near-cutoff condition may be composed of a plurality of waveguides under a near-cutoff condition, which are vertically arranged up and down, depending on the circumstances. In this case, the plurality of waveguides under the near-cutoff condition, constituting the waveguide 610, have respective input and output slits through which a target is pushed in and withdrawn from the waveguides in the above-described manner, and microwaves may be incident on each waveguide under the near-cutoff condition through one inlet or opposite inlets of the waveguide in the above-described manner.

Figure 20:
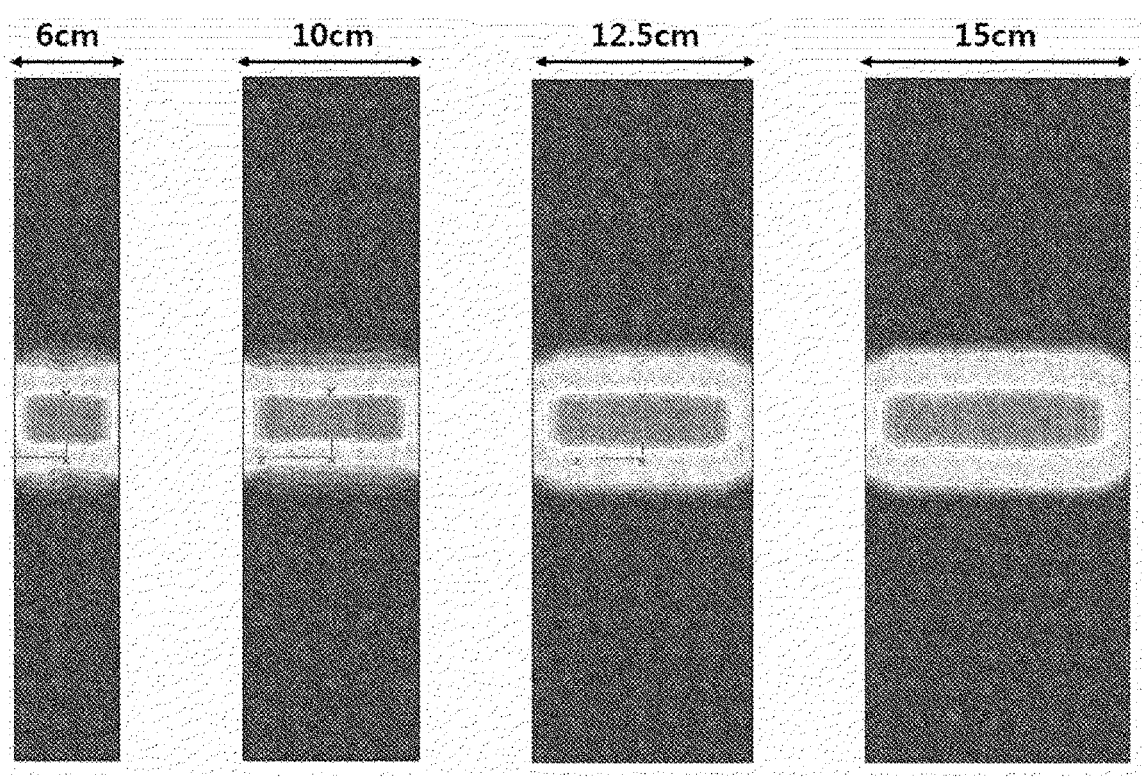
FIGS. 20 to 22 are diagrams showing the analysis results of simulation to describe the heating uniformity of a target using the microwave heating apparatus of FIG. 19.
Figure 21:
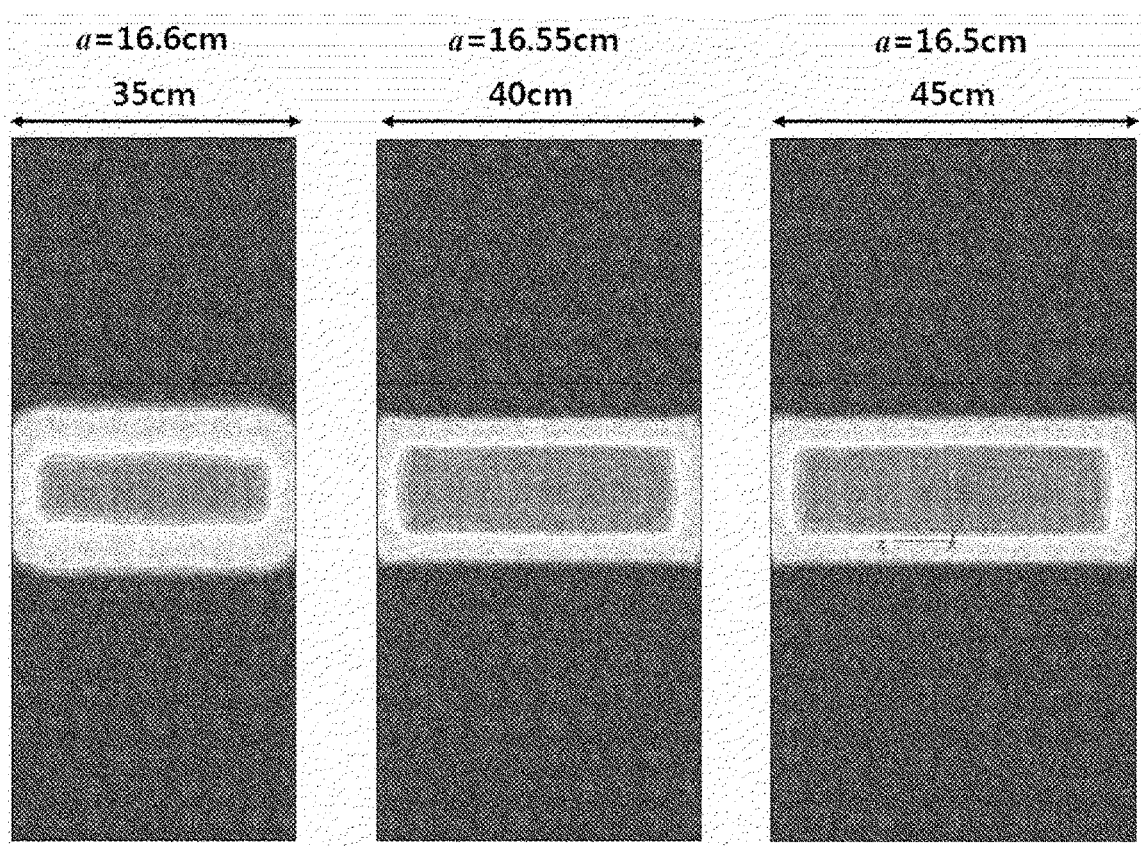
Figure 22:
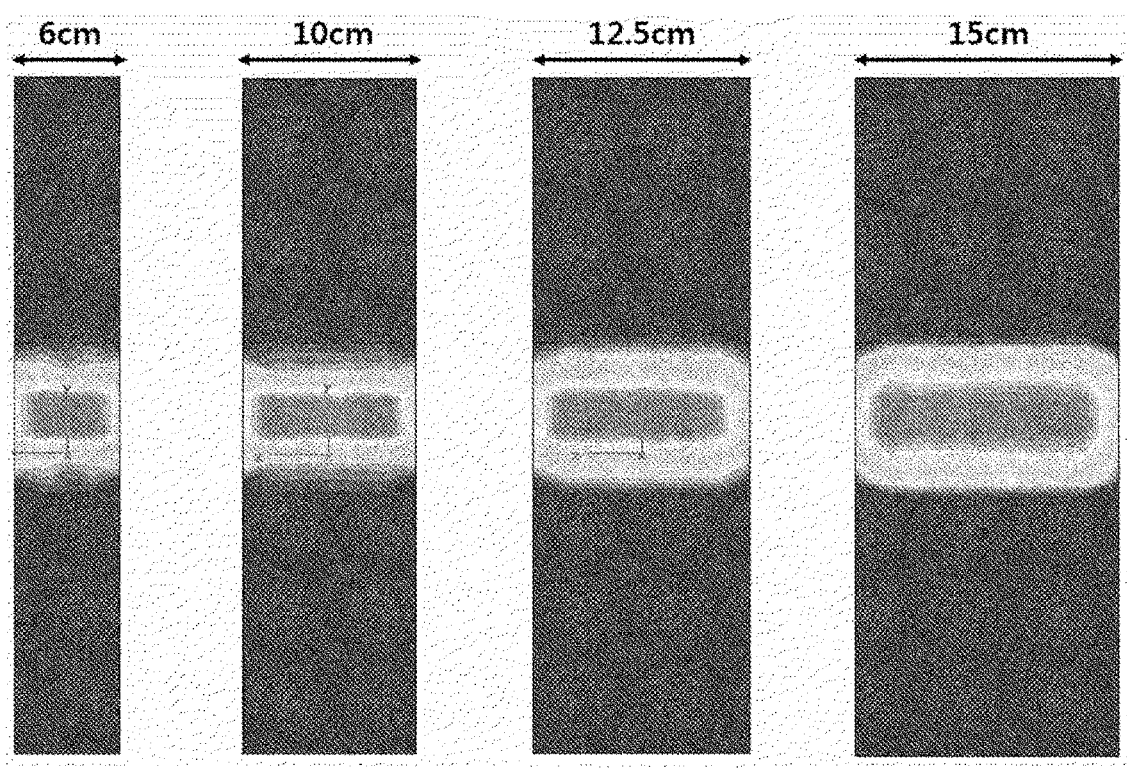

FIGS. 20 to 22 are diagrams showing the analysis results of simulation to describe the heating uniformity of a target using the microwave heating apparatus of FIG. 19.

First, as shown in FIG. 20, it can be seen that, as the results of simulation performed when a microwave having a frequency of 2.45 GHz is incident on one side of each waveguide, that is, the waveguide 610 (e.g., a=62.4 mm) under a near-cutoff condition and the waveguides (e.g., a=62 mm) 621, 622, 631, and 632 under a near-cutoff condition, the influence of a free space microwave mode is reduced, and uniform heating for individual longitudinal (z direction) locations of each target is improved with respect to targets having various widths (ranging from 6 to 15 cm).

Further, as shown in FIG. 21, it can be seen that, as results of simulation performed when the waveguide 610 under the near-cutoff condition and the waveguides 621, 622, 631, and 632 under the near-cutoff condition are used, and a microwave having a frequency of 915 MHz is incident on one side of each waveguide while changing the value of 'a' to 16.6, 15.55, and 16.5 cm for each of widths 35, 40, and 45 cm of the target, the influence of a free space microwave mode is reduced, and uniform heating for individual longitudinal (z direction) locations of each target is improved.

Furthermore, as shown in FIG. 22, it can be seen that, as the results of simulation performed when the waveguide 610 (e.g., a=62.4 mm) under a near-cutoff condition and the waveguides (e.g., a=52.4 mm) 621, 622, 631, and 632 under a cutoff condition are used and when a microwave having a frequency of 2.45 GHz is incident on one side of each waveguide, the influence of a free space microwave mode is reduced, and uniform heating for individual longitudinal (z direction) locations of each target is improved with respect to targets having various widths (ranging from 6 to 15 cm).

As described above, although the present invention has been described with reference to limited embodiments and drawings, the present invention is not limited by the embodiments, and may be changed and modified in various forms by those skilled in the art to which the present invention pertains from the description of the embodiments. Therefore, the scope of the present invention should not be limited and defined by the above-described embodiments, and should be defined by the accompanying claims and equivalents thereof.

The invention claimed is:

1. A microwave heating apparatus, comprising:
a waveguide configured to accommodate a target disposed in a microwave travelling space;
a microwave generator that generates a first microwave having a first wavelength and is coupled to the waveguide such that the microwave generator causes the first microwave to be incident on the microwave travelling space through a first inlet of the waveguide; and
a wavelength controller made of a metal material and disposed within the waveguide adjacent to the microwave travelling space within the waveguide,
wherein the first microwave travels in a longitudinal direction of the waveguide, and the wavelength controller is configured to move in a direction orthogonal to the longitudinal direction and an electric field direction from a sidewall of the waveguide in order to increase the first wavelength of the first microwave to be a second wavelength inside the microwave travelling space, and
wherein the target is located in the microwave travelling space that is disposed between the wavelength controller and an opposite sidewall of the waveguide to be exposed to the microwave of the second wavelength.

2. The microwave heating apparatus of claim 1, wherein the wavelength controller causes the microwave having the second wavelength to be 2.0 to 100 times longer than the first wavelength of the microwave.

3. The microwave heating apparatus of claim 1, wherein:
the wavelength controller comprises location control means attached to and protruding outwardly from a side surface thereof.

4. The microwave heating apparatus of claim 1, further comprising a reflecting plate,
wherein the reflecting plate is disposed on an opposite side of the waveguide from the first inlet, and the microwave is reflected by the reflecting plate and travels back into the microwave travelling space.

5. The microwave heating apparatus of claim 4, wherein the reflecting plate reciprocates forwards and backwards, reciprocates and rotates, or repeatedly rotates about a central axis of the reflecting plate at an angle of 360°.

6. The microwave heating apparatus of claim 1, further comprising an input slit and an output slit that communicate with an inside of the waveguide,
wherein the target is pushed into the waveguide through the input slit and withdrawn from the waveguide through the output slit, either manually or using a mechanical device.

7. The microwave heating apparatus of claim 1, wherein the target to be heated has a thickness that is ⅛ or less of the first wavelength of the microwave.

8. The microwave heating apparatus of claim 1, wherein the wavelength controller is implemented as a protrusion on one sidewall of the waveguide, and the microwave travelling space extends between the protrusion and an opposite sidewall of the waveguide.

9. The microwave heating apparatus of claim 1, wherein the target located in the wavelength control space is heated by changing an amplitude, a phase or a frequency of one or more of microwaves respectively incident on opposite inlets of the waveguide.

10. The microwave heating apparatus of claim 1, wherein the target to be inserted into a slit includes a powdered target placed on predetermined transfer means.

11. The microwave heating apparatus of claim 9, further comprising:
a distributor for generating a second microwave having an identical amplitude and an identical frequency to the first microwave generated by the microwave generator; and
a phase converter for controlling a phase of the second microwave,
wherein the first microwave is incident on the wavelength control space through a first inlet of the waveguide, and
wherein the phase-controlled second microwave is incident on the wavelength control space through a second inlet of the waveguide.

12. The microwave heating apparatus of claim 11, wherein the phase converter repeatedly controls the phase of the second microwave within a predetermined range.

13. The microwave heating apparatus of claim 9, wherein the microwave generator comprises:
a first microwave generator for generating the first microwave and causing the first microwave to be incident on the wavelength control space through a first inlet of the waveguide;
a second microwave generator for generating a second microwave; and
a phase converter for controlling a phase of the second microwave and causing a phase-controlled second microwave to be incident on the wavelength control space through a second inlet of the waveguide.

14. The microwave heating apparatus of claim 13, wherein the phase converter repeatedly controls the phase of the second microwave within a predetermined range.

15. The microwave heating apparatus of claim 9, wherein the microwave generator comprises:
a first microwave generator for generating the first microwave and causing the first microwave to be incident on the wavelength travelling space through the first inlet of the waveguide; and
a second microwave generator for generating a second microwave and causing the second microwave to be incident on the wavelength travelling space through a second inlet of the waveguide, wherein the first microwave generator changes an amplitude or a frequency of the first microwave or, alternatively, the second microwave generator changes an amplitude or a frequency of the second microwave.

16. The microwave heating apparatus of claim 15, wherein the first microwave generator repeatedly changes the frequency of the first microwave within a predetermined range or alternatively, the second microwave generator repeatedly changes the frequency of the second microwave within a predetermined range.

17. The microwave heating apparatus of claim 6, further comprising:
one or more second waveguides arranged on or under the waveguide, each second waveguide having an input slit and an output slit, each second waveguide having a wavelength control space under a near-cutoff condition or a cutoff condition,
wherein the target is pushed in and withdrawn from the waveguide and the second waveguides through respective input slits and output slits of the waveguide and the second waveguides.

18. The microwave heating apparatus of claim 17, wherein a microwave, an amplitude or a frequency of which is changed, is incident on each second waveguide under the near-cutoff condition through a first inlet of the second waveguide or, alternatively, an amplitude, a phase or a frequency of one or more of microwaves respectively incident on opposite inlets of the second waveguide is changed.

* * * * *